United States Patent
Hiroki et al.

(10) Patent No.: US 9,812,745 B2
(45) Date of Patent: Nov. 7, 2017

(54) POWER STORAGE DEVICE

(71) Applicant: SEMICONDUCTOR ENERGY LABORATORY CO., LTD., Atsugi-shi, Kanagawa-ken (JP)

(72) Inventors: Masaaki Hiroki, Kanagawa (JP); Minoru Takahashi, Nagano (JP); Junpei Momo, Kanagawa (JP)

(73) Assignee: Semiconductor Energy Laboratory Co., LTD., Kanagawa-ken (JP)

(*) Notice: Subject to any disclaimer, the term of this patent is extended or adjusted under 35 U.S.C. 154(b) by 380 days.

(21) Appl. No.: 14/107,174

(22) Filed: Dec. 16, 2013

(65) Prior Publication Data
US 2014/0186663 A1 Jul. 3, 2014

(30) Foreign Application Priority Data
Dec. 28, 2012 (JP) ................................. 2012-287543

(51) Int. Cl.
| | | |
|---|---|---|
| *H01M 10/52* | (2006.01) | |
| *H01M 2/02* | (2006.01) | |
| *H01M 2/12* | (2006.01) | |
| *H01M 10/0525* | (2010.01) | |
| *H01M 2/16* | (2006.01) | |

(52) U.S. Cl.
CPC ......... *H01M 10/52* (2013.01); *H01M 2/0277* (2013.01); *H01M 2/0285* (2013.01); *H01M 2/0292* (2013.01); *H01M 2/1264* (2013.01); *H01M 2/1653* (2013.01); *H01M 2/1666* (2013.01); *H01M 10/0525* (2013.01); *H01M 2/1613* (2013.01)

(58) Field of Classification Search
None
See application file for complete search history.

(56) References Cited

U.S. PATENT DOCUMENTS

| | | |
|---|---|---|
| 7,041,412 B2 | 5/2006 | Ishida et al. |
| 7,077,877 B2 | 7/2006 | Ishida et al. |

(Continued)

FOREIGN PATENT DOCUMENTS

| | | |
|---|---|---|
| CN | 001399366 A | 2/2003 |
| JP | 07-192775 A | 7/1995 |

(Continued)

OTHER PUBLICATIONS

JP 2008-146963—Separator for nonaqueous electrolyte secondary battery, nonaqueous electrolyte secondary battery, and battery pack (Espacenet English translation—Abstract only).*

(Continued)

*Primary Examiner* — Sarah A Slifka
(74) *Attorney, Agent, or Firm* — Nixon Peabody LLP; Jeffrey L. Costellia

(57) ABSTRACT

To provide a highly reliable power storage device, to improve the security of a power storage device, and to suppress deterioration of a power storage device, a power storage device includes, inside an exterior material, a positive electrode, a negative electrode facing the positive electrode, an electrolyte solution between the positive electrode and the negative electrode, and an adsorbent. A separation body which is impermeable to the electrolyte solution and permeable to a gas is provided between the electrolyte solution and the adsorbent.

10 Claims, 12 Drawing Sheets

(56) References Cited

U.S. PATENT DOCUMENTS

| | | |
|---|---|---|
| 8,460,808 B2 | 6/2013 | Toia et al. |
| 2003/0049519 A1* | 3/2003 | Ishida ................. H01M 10/052 |
| | | 429/57 |
| 2010/0183914 A1 | 7/2010 | Toia et al. |

FOREIGN PATENT DOCUMENTS

| | | | |
|---|---|---|---|
| JP | 11-204143 A | | 7/1999 |
| JP | 2001-126766 A | | 5/2001 |
| JP | 2003-077549 A | | 3/2003 |
| JP | 2008146963 A | * | 6/2008 |
| JP | 2010-003657 A | | 1/2010 |
| JP | 2010-0205546 A | | 9/2010 |
| JP | 2011-029000 A | | 2/2011 |

OTHER PUBLICATIONS

JP 2008-146963 (Kazuto)—Separator for nonaqueous electrolyte secondary battery, nonaqueous electrolyte secondary battery, and battery pack (Espacenet English translation).*
Chinese Office Action (Application No. 201310724373.9), dated Mar. 2, 2017.

* cited by examiner

POWER STORAGE DEVICE

BACKGROUND OF THE INVENTION

1. Field of the Invention

The present invention relates to an object (a product including a machine, a manufacture, and a composition of matter) and a method (a process including a simple method and a production method). In particular, one embodiment of the present invention relates to a power storage device, a semiconductor device, a light-emitting device, a display device, an electrical device, a driving method thereof, or a manufacturing method thereof.

In this specification, a power storage device refers to any device which can store power, and a secondary battery (also referred to as a storage battery), a structure provided with a control circuit relating to charging and discharging, and a structure provided with a power supply circuit such as a converter are all included in power storage devices.

In this specification, a semiconductor device refers to any device which can function by utilizing semiconductor characteristics; an electrooptic device, a light-emitting display device, a semiconductor circuit, and an electronic device are all included in semiconductor devices.

2. Description of the Related Art

In recent years, a variety of power storage devices, for example, secondary batteries such as lithium-ion secondary batteries, lithium-ion capacitors, and air cells have been actively developed. In particular, demand for lithium-ion secondary batteries with high output and high energy density has rapidly grown with the development of the semiconductor industry, for electronic devices, for example, portable information terminals such as cell phones, smartphones, and laptop computers, portable music players, and digital cameras; medical equipment; next-generation clean energy vehicles such as hybrid electric vehicles (HEVs), electric vehicles (EVs), and plug-in hybrid electric vehicles (PHEVs); and the like. The lithium-ion secondary batteries are essential as rechargeable energy supply sources for today's information society.

A lithium-ion secondary battery includes a negative electrode, a positive electrode, and an electrolyte solution including a non-aqueous electrolyte containing a lithium salt and an organic solvent, for example. A method for manufacturing a lithium-ion battery is disclosed in Patent Document 1, for example.

REFERENCE

Patent Document

[Patent Document 1] Japanese Published Patent Application No. 2011-29000

SUMMARY OF THE INVENTION

A negative electrode of a power storage device is formed using a material having an extremely low electrode potential and thus has a high reducing ability. Hence, part of an electrolyte solution including an organic solvent is reduced and decomposed, whereby a coating film which is a decomposed matter is formed on the negative electrode. Further, in some cases, the part of the reduced and decomposed electrolyte solution becomes a gas and remains in the power storage device. Also on the positive electrode side, in some cases, the electrolyte solution is similarly decomposed and a gas is generated in the case where high voltage is used.

Such a gas serves as an impurity for the power storage device and may become a factor which causes various types of deterioration. Further, there is a concern that the generated gas may increase the pressure of the inside of the hermetically sealed power storage device and cause malfunctions such as expansion of a housing of the power storage device and damage, explosion, and the like of the power storage device.

An object of one embodiment of the present invention is to provide a highly reliable power storage device or the like. Another object is to improve the security of a power storage device or the like. Another object is to suppress deterioration of a power storage device or the like. Another object is to provide a power storage device which is less likely to corrode. Another object is to provide a power storage device or the like in which a carrier moves easily. Another object is to provide a power storage device or the like in which the pressure inside is less likely to increase. Another object is to provide a power storage device or the like which is less likely to be damaged. Another object is to provide a power storage device or the like which is chemically stable. Another object is to provide a small-sized power storage device or the like. Another object is to provide a lightweight power storage device or the like.

Another object of one embodiment of the present invention is to provide a novel power storage device or the like. Another object of one embodiment of the present invention is to provide a novel semiconductor device or the like. Another object of one embodiment of the present invention is to provide a novel light-emitting device or the like. Another object of one embodiment of the present invention is to provide a novel display device or the like.

Another object of one embodiment of the present invention is to provide a highly reliable semiconductor device or the like having stable electrical characteristics. Another object of one embodiment of the present invention is to provide a semiconductor device or the like exhibiting favorable electrical characteristics. Another object of one embodiment of the present invention is to provide a semiconductor device or the like having small variation in electrical characteristics.

Note that the descriptions of these objects do not disturb the existence of other objects. Note that there is no need to achieve all of these objects with one embodiment of the present invention. Other objects will be apparent from and can be derived from the description of the specification, the drawings, the claims, and the like.

One embodiment of the present invention is a power storage device including an exterior material having a positive electrode, a negative electrode facing the positive electrode, an electrolyte solution between the positive electrode and the negative electrode, and an adsorbent. The positive electrode, the negative electrode, the electrolyte solution, and the adsorbent are provided inside the exterior material. A separation body which is impermeable to the electrolyte solution and permeable to a gas is provided between the electrolyte solution and the adsorbent.

In the power storage device of one embodiment of the present invention, it is preferable to use a structure in which a space surrounded by the separation body is provided inside the exterior material and the adsorbent is provided in the space.

In the power storage device of one embodiment of the present invention, it is preferable to use a structure in which a space surrounded by an inner wall of the exterior material and the separation body is provided inside the exterior material and the adsorbent is provided in the space.

The adsorbent may be coated with the separation body.

In the power storage device of one embodiment of the present invention, it is preferable to use a structure in which the adsorbent coated with the separation body is fixed to a support and the support is provided to overlap with the positive electrode and the negative electrode.

The support may be provided between the positive electrode and the negative electrode so as to overlap with the positive electrode and the negative electrode.

In one embodiment of the present invention, a highly reliable power storage device can be provided. Further, the security of a power storage device can be improved. Furthermore, deterioration of a power storage device can be controlled.

DETAILED DESCRIPTION OF THE INVENTION

Figure 1A:
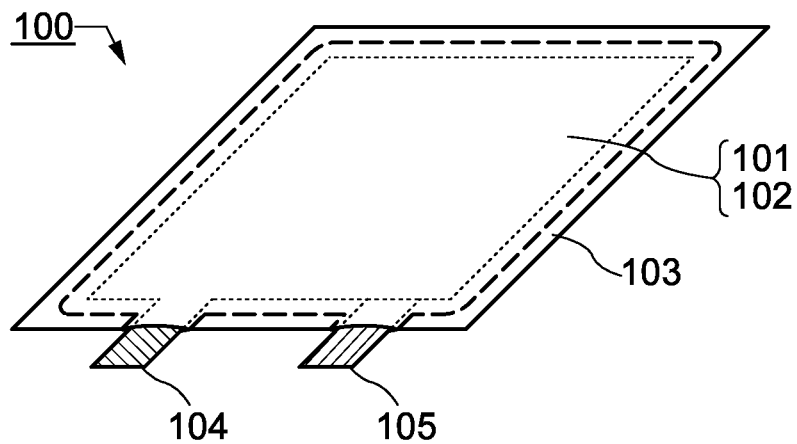
FIGS. 1A to 1C illustrate a power storage device according to an embodiment.

Embodiments will be described in detail with reference to the drawings. Note that the present invention is not limited to the following description, and it will be easily understood by those skilled in the art that various changes and modifications can be made without departing from the spirit and scope of the present invention. Therefore, the present invention should not be construed as being limited to the description in the following embodiments.

Note that in the structures of the invention described below, the same portions or portions having similar functions are denoted by the same reference numerals in different drawings, and description of such portions is not repeated. Further, the same hatching pattern is applied to portions having similar functions, and the portions are not especially denoted by reference numerals in some cases.

Note that in each drawing described in this specification, the size, the layer thickness, or the region of each component is exaggerated for clarity in some cases. Therefore, embodiments of the present invention are not limited to such scales.

Embodiment 1

In this embodiment, structural examples of a power storage device of one embodiment of the present invention are described with reference to drawings.

[Structural Example 1]

FIG. 1A is a schematic view of a power storage device 100 described in this structural example. The power storage device 100 described in this structural example is a laminated power storage device.

The power storage device 100 includes an exterior material 103, and a power storage body 101 and a gas adsorbing body 102 are sealed in the exterior material 103. Here, a film-like laminate film is used as the exterior material 103. Further, a positive electrode 104 and a negative electrode 105 for forming the power storage body 101 are provided so that parts thereof are exposed to the outside of the exterior material 103. The exposed parts serve as terminals.

Figure 1B:
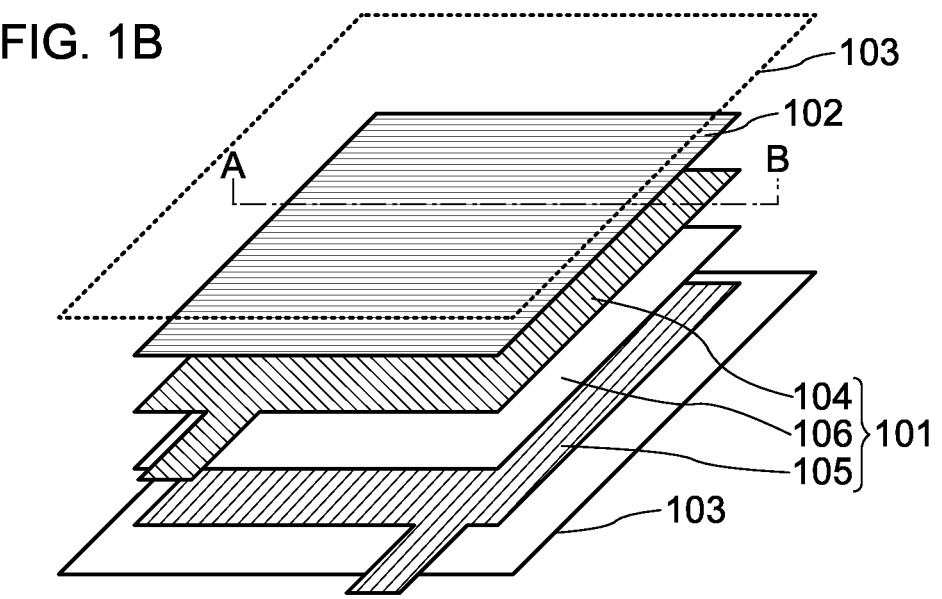

FIG. 1B is a schematic view in which the power storage device 100 is developed.

The power storage body 101 includes the positive electrode 104, the negative electrode 105, and a separator 106 provided between the positive electrode 104 and the negative electrode 105, and further, an electrolyte solution (not illustrated) is provided at least between the positive electrode 104 and the negative electrode 105. Furthermore, the gas adsorbing body 102 is provided to overlap with the power storage body 101.

The positive electrode 104 serves as a positive electrode of the power storage body 101 and includes at least a positive electrode active material. The negative electrode 105 serves as a negative electrode of the power storage body 101 and includes at least a negative electrode active material. The positive electrode 104 and the negative electrode 105 may each include a current collector, a conductive additive, a binder, and the like.

The separator 106 is provided to prevent direct contact between the positive electrode 104 and the negative electrode 105. The separator 106 is formed using a material which is chemically stable with respect to the electrolyte solution and which is permeable to the electrolyte solution.

The electrolyte solution includes at least an electrolyte and a solvent in which the electrolyte is dissolved. The electrolyte solution may impregnate the separator 106.

The gas adsorbing body 102 includes an adsorbent 111 and a separation body 112 provided between the adsorbent 111 and the electrolyte solution. The adsorbent 111 adsorbs a gas. The separation body 112 is impermeable to the electrolyte solution and permeable to a gas.

The separation body 112 has a function of being not permeated with a liquid but permeated with a gas. The separation body 112 can be formed using, for example, a material which transmits a target gas (e.g., carbon dioxide) in a normal state at a gas transmission rate of higher than or equal to 0.1 [$g/m^2 \cdot day$], preferably higher than or equal to 1 [$g/m^2 \cdot day$], more preferably higher than or equal to 10 [$g/m^2 \cdot day$]. Note that a gas transmission rate depends on a material and a thickness of the separation body 112; thus, the material and the thickness thereof may be set as appropriate so that the gas transmission rate becomes suitable.

Figure 1C:
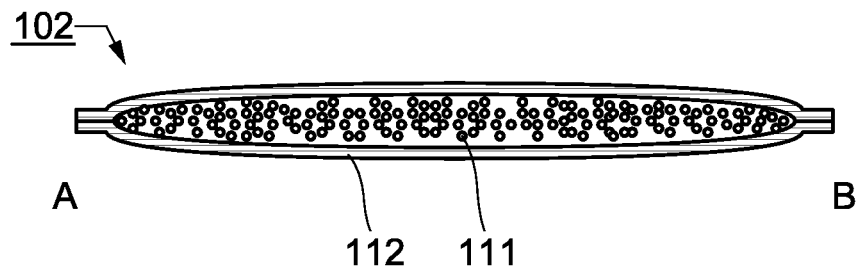

FIG. 1C is a schematic cross-sectional view of the gas adsorbing body 102 taken along the line A-B in FIG. 1B.

The gas adsorbing body 102 includes the separation body 112 having a space inside. A plurality of particle-like adsorbents 111 is included in the space. The separation body 112 prevents the adsorbents 111 from being in contact with the electrolyte solution.

Here, the negative electrode 105 of the power storage device 100 is formed using a material having an extremely low electrode potential with respect to the positive electrode 104 and thus has a high reducing ability. Hence, part of the electrolyte solution is reduced and decomposed, so that a coating film which is a decomposed matter is formed on the negative electrode 105. Further, in some cases, the part of the reduced and decomposed electrolyte solution becomes a gas and remains in the power storage device 100. Also on the positive electrode 104 side, in some cases, the electrolyte solution is similarly decomposed in the case where high voltage is used (in the case where the voltage is higher than voltage at which the solvent of the electrolyte solution is decomposed), so that a gas including an element which forms the electrolyte solution is generated.

Such a gas serves as an impurity for the power storage device 100 and might become a factor which causes various types of deterioration. For example, in the case where an oxidizing gas or a reducing gas is generated, there is a concern that the gas might react with and corrode the inside of the exterior material 103, the positive electrode 104, the negative electrode 105, the separator 106, or the like. In the case where the gas remains between the positive electrode 104 and the negative electrode 105, the gas inhibits movement of a carrier. Further, there is a concern that the generated gas might increase the pressure inside of the hermetically sealed power storage device and cause malfunctions such as expansion of a housing of the power storage device and damage, explosion, and the like of the power storage device.

In the power storage device 100 described in this structural example, when part of the electrolyte solution is reduced and decomposed and a gas is generated, the gas permeating the separation body 112 can be adsorbed by the adsorbent 111. Thus, a gas remaining in the power storage device 100 can be reduced. Hence, the above-described malfunctions are inhibited, and a highly reliable power storage device can be obtained.

Figure 2:
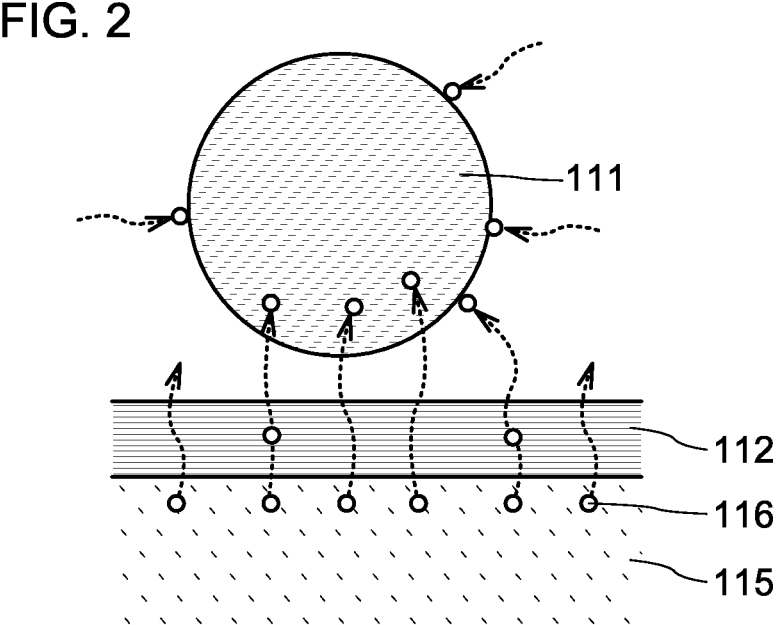
FIG. 2 illustrates a power storage device according to an embodiment.

The behavior of the gas included in the electrolyte solution is described with reference to FIG. 2.

A gas 116 generated by reduction and decomposition of part of an electrolyte solution 115 is included in the electrolyte solution 115. The gas 116 is a gas containing an element which forms the electrolyte solution 115. For example, the gas 116 is a gas containing at least one of C, O, and H, such as hydrogen, oxygen, carbon monoxide, carbon dioxide, or a variety of hydrocarbons.

The separation body 112 has a function of being hardly permeable to a liquid and being permeable to a gas. Thus, as shown in FIG. 2, the gas 116 in the electrolyte solution 115 permeates the separation body 112. On the other hand, the electrolyte solution 115 does not permeate the separation body 112.

The gas 116 permeating the separation body 112 is adsorbed by the adsorbent 111. For example, a molecule contained in the gas 116 can be adsorbed by the adsorbent 111 by chemical adsorption or physical adsorption.

The adsorbent 111 can be formed using a material having a function of adsorbing a molecule by chemical adsorption or physical adsorption. For example, a material which adsorbs a gas by physical adsorption, such as zeolite, silica gel, activated alumina, and activated carbon, can be used. Further, a material which adsorbs a gas by chemical adsorption, such as an oxide of an alkaline earth metal (e.g., calcium oxide or barium oxide), can be used. When a porous particle is used as the adsorbent 111, the surface area of the adsorbent 111 is increased; thus, a gas can be adsorbed efficiently. The adsorbent 111 preferably has a particle-like shape; however, the shape of the adsorbent 111 is not limited thereto. The adsorbent 111 can have any of a variety of shapes, e.g., a shape of a spherical particle (including an ellipsoidal particle), a cylindrical particle, a prism-like particle, and the like; a sheet-like shape; and a flat-plate-like shape.

The separation body 112 can be formed using a material which is chemically stable with respect to the electrolyte solution 115, has a low permeability to a liquid, and has a function of being permeated with a gas. For example, an organic material such as cellulose, polypropylene (PP), polyethylene (PE), polybutene, nylon, polyester, polysulfone, polyacrylonitrile, polyvinylidene fluoride, tetrafluoroethylene, or polytetrafluoroethylene (PTFE) can be used. Further, an inorganic insulating material such as metal oxide, metal nitride, semiconductor oxide, or semiconductor nitride, e.g., silicon oxide, silicon nitride, aluminum oxide, or aluminum nitride can be used. The separation body 112 may have any of a variety of shapes such as a sheet-like shape, a flat-plate-like shape, and a film-like shape. Further, the separation body 112 may be provided to cover the adsorbent 111 as shown in a structural example described later, in which case the vicinity of the adsorbent 111 is coated with any of the above-described materials by an appropriate method.

The above is the description of this structural example.

[Structural Example 2]

Described below is a structural example of a power storage device whose structure is partly different from that in the structural example 1. Note that description of the portions already described is omitted and only different portions are described.

The structure of the power storage device described in this structural example is different from the structure of the power storage device 100 of the structural example 1 in the structure of the gas adsorbing body 102, while the other structures are similar to those of the power storage device 100 of the structural example 1.

Figure 3A:
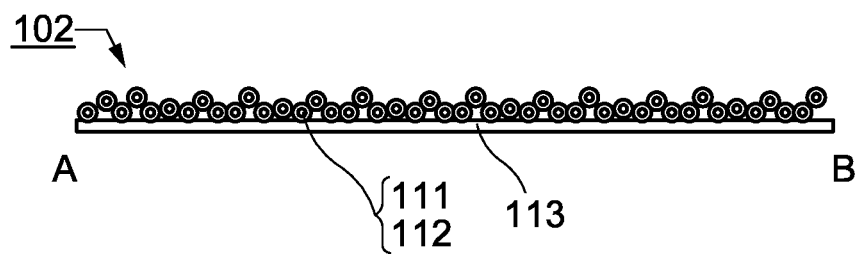
FIGS. 3A to 3D illustrate power storage devices according to embodiments.

FIG. 3A is a schematic cross-sectional view of a gas adsorbing body 102. The gas adsorbing body 102 includes an adsorbent 111 having a particle-like shape, a separation body 112 coating the adsorbent 111, and a support 113.

Figure 3B:
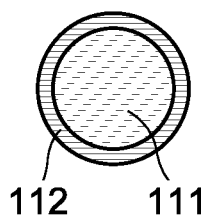

FIG. 3B is an enlarged schematic view of the adsorbent 111 and the separation body 112. The separation body 112 is provided to coat the adsorbent 111. A gas generated in the power storage device can permeate the separation body 112 and be adsorbed by the adsorbent 111.

The adsorbent 111 coated with the separation body 112 is fixed to the support 113 having a sheet-like shape. As the support 113, a material which is chemically stable with respect to the electrolyte solution can be used. For example, a material similar to that for the separator 106 may be used.

The adsorbent 111 coated with the separation body 112 may be fixed to the support 113 having viscosity or may be fixed to the support 113 with an adhesive.

With such a structure, the surface area of the separation body 112 can be increased. Thus, a gas can be adsorbed by the adsorbent 111 more efficiently.

Figure 3C:
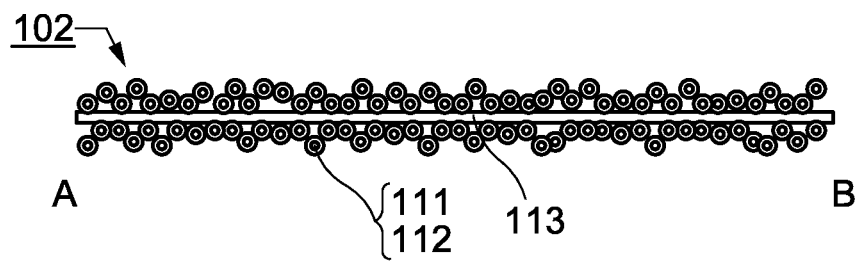
Figure 3D:
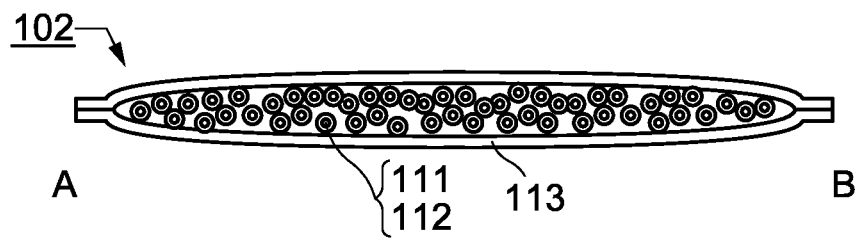

FIGS. 3C and 3D show different modes of the gas adsorbing body 102. In a gas adsorbing body 102 shown in FIG. 3C, adsorbents 111 each coated with a separation body 112 are fixed to opposite surfaces of a sheet-like support 113. With such a structure, the amount of a gas adsorbed by the gas adsorbing body 102 per unit area can be increased. In a gas adsorbing body 102 shown in FIG. 3D, adsorbents 111 each coated with a separation body 112 is sealed between a pair of sheet-like supports 113. Such a structure can inhibit the adsorbents 111 each coated with the separation body 112 from being released from the support 113.

The above is the description of this structural example.

[Structural Example 3]

Described below is another structural example whose structure is partly different from those of the structural examples described above. Note that description of the portions already described is omitted and only different portions are described.

Figure 4A:
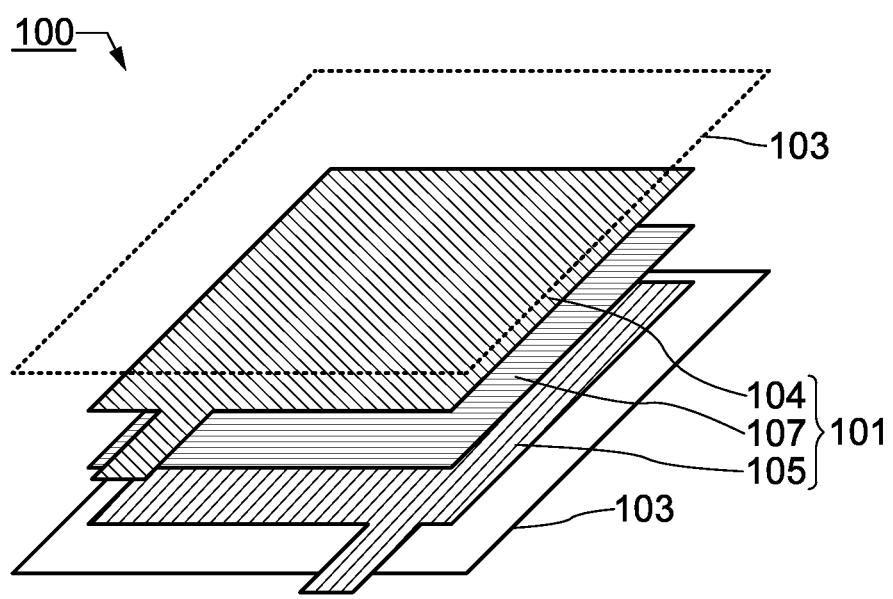
FIGS. 4A and 4B illustrate a power storage device according to an embodiment.

FIG. 4A is a schematic developed view of a power storage device 100 described in this structural example. The structure of the power storage device described in this structural example is different from the structure of the power storage device 100 of the structural example 1 in that the gas adsorbing body 102 overlapping with the power storage body is not included and that the structure of the separator is different, while the other structures are similar to those of the power storage device 100 of the structural example 1.

The power storage device 100 is provided with a power storage body 101 in which a separator 107 is provided between a positive electrode 104 and a negative electrode 105.

Figure 4B:
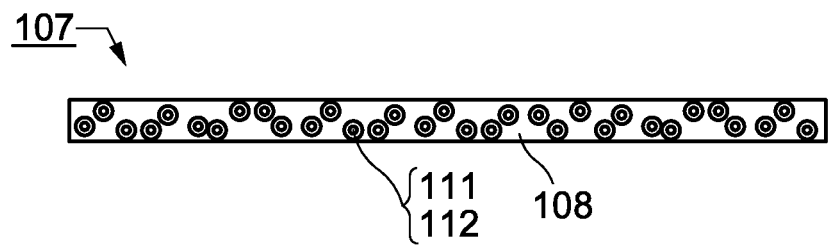

FIG. 4B is a schematic cross-sectional view of the separator 107. The separator 107 has a structure in which adsorbents 111 each coated with a separation body 112 are dispersed in a support 108.

The support 108 has a function similar to that of the separator 106. In addition, the support 108 has a structure capable of holding the adsorbents 111 each coated with the separation body 112 inside the support 108. For example, the support 108 is formed using a fibrous material and holds, inside the support 108, the adsorbents 111 which are particles each coated with the separation body 112. Alternatively, for example, the adsorbents 111 each coated with the separation body 112 may be provided between a pair of sheet-like supports 108.

With such a structure, the adsorbents 111 each coated with the separation body 112 can be provided between the positive electrode 104 and the negative electrode 105. Thus, reduction in the efficiency of power storage due to a gas remaining between the electrodes can be inhibited efficiently. Further, it is not necessary to provide a gas adsorbing body; hence, increase of the volume and the weight of the power storage device 100 can be inhibited.

The above is the description of this structure example.

[Structural Example 4]

In this structural example, a structural example of a power storage device whose structure is partly different from those of the structural examples described above is described.

Figure 5:
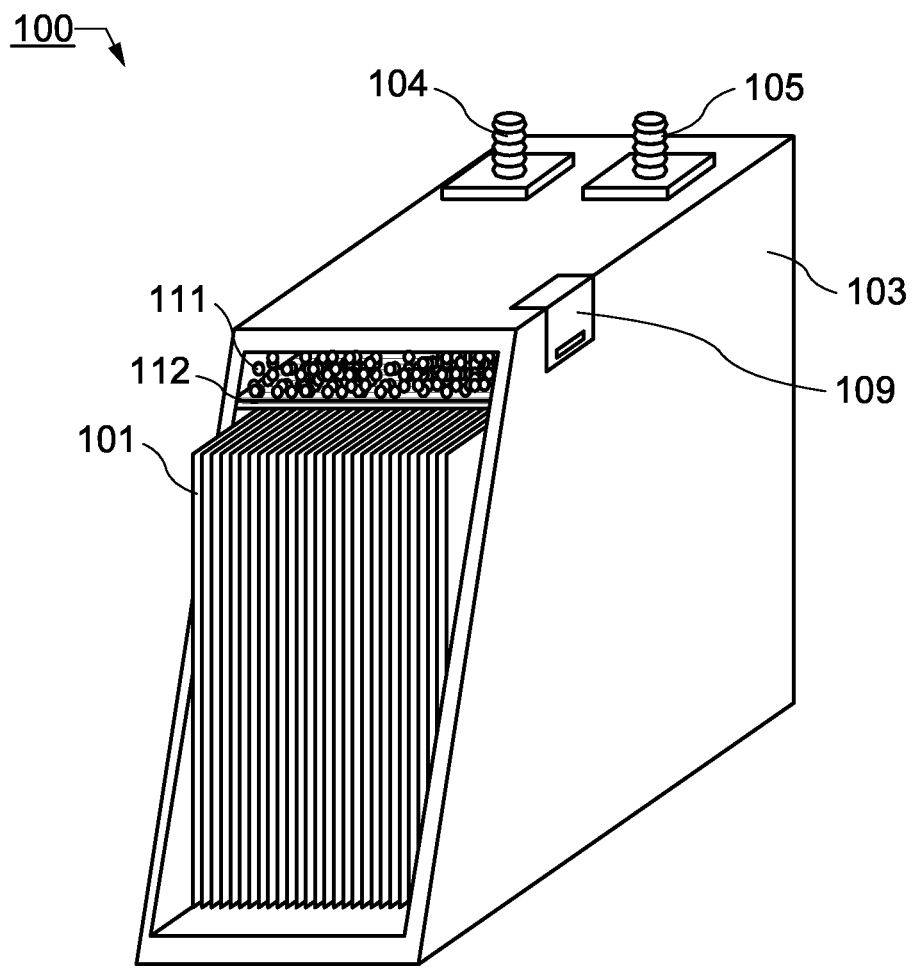
FIG. 5 illustrates a power storage device according to an embodiment.

FIG. 5 is a schematic view of a power storage device 100 described in this structural example. In FIG. 5, part of an exterior material 103 is cut off to show the inside of the power storage device 100.

The power storage device 100 is provided with a plurality of power storage bodies 101 in a box-shaped exterior material 103. The power storage bodies 101 overlap with each other. A separation body 112 is provided in contact with the inner wall of the exterior material 103, thereby forming a space surrounded by part of the exterior material 103 and the separation body 112. Further, a plurality of adsorbents 111 is provided in the space. That is, the separation body 112 is provided to separate the inside of the exterior material 103 into a region including the plurality of power storage bodies 101 and a region including the adsorbents 111. Furthermore, although not shown, the plurality of power storage bodies 101 includes an electrolyte solution with which a positive electrode, a negative electrode, and a separator are impregnated. The electrolyte solution is supplied inside the exterior material 103.

In the exterior material 103, the positive electrode 104 and the negative electrode 105 are provided so that parts thereof are exposed. The exposed parts serve as terminal portions.

A gas generated from the power storage body 101 moves upward in the electrolyte solution and permeate the separation body 112. Thus, the gas can be adsorbed by the adsorbents 111. When such adsorbents 111 are provided in the upper portion inside the exterior material 103, a gas can be adsorbed efficiently. Note that the adsorbents 111 may be provided in the side portion, the bottom portion, or the like inside the exterior material 103 so as to be separated from the space surrounded by part of the exterior material 103 and the separation body 112.

Further, the exterior material 103 is provided with an open/close portion 109 which connects the space including the adsorbents 111 and the outside. With such a structure, the adsorbents 111 can be easily exchanged even when the adsorption ability of the adsorbents 111 is decreased. Thus, a highly reliable power storage device which can be continuously used for a long period can be obtained.

The above is the description of this structure example.

[Structural Example 5]

In this structural example, a structural example of a power storage device whose structure is partly different from those of the structural examples described above is described.

Figure 6A:
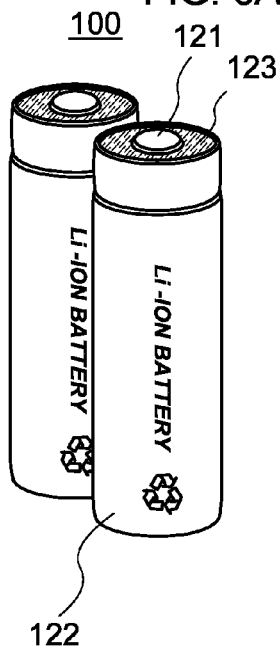
FIGS. 6A and 6B illustrate a power storage device according to an embodiment.

FIG. 6A is a schematic view of a cylindrical power storage device 100 described in this structural example. As illustrated in FIG. 6A, a power storage device 100 includes a positive electrode cap (battery cap) 121 on the top surface and a battery can (outer can) 122 on the side surface and bottom surface. The positive electrode cap 121 and the battery can 122 are insulated from each other by a gasket (insulating gasket) 123. Here, the positive electrode cap 121, the battery can 122, and the gasket 123 collectively correspond to the exterior material 103 described above.

Figure 6B:
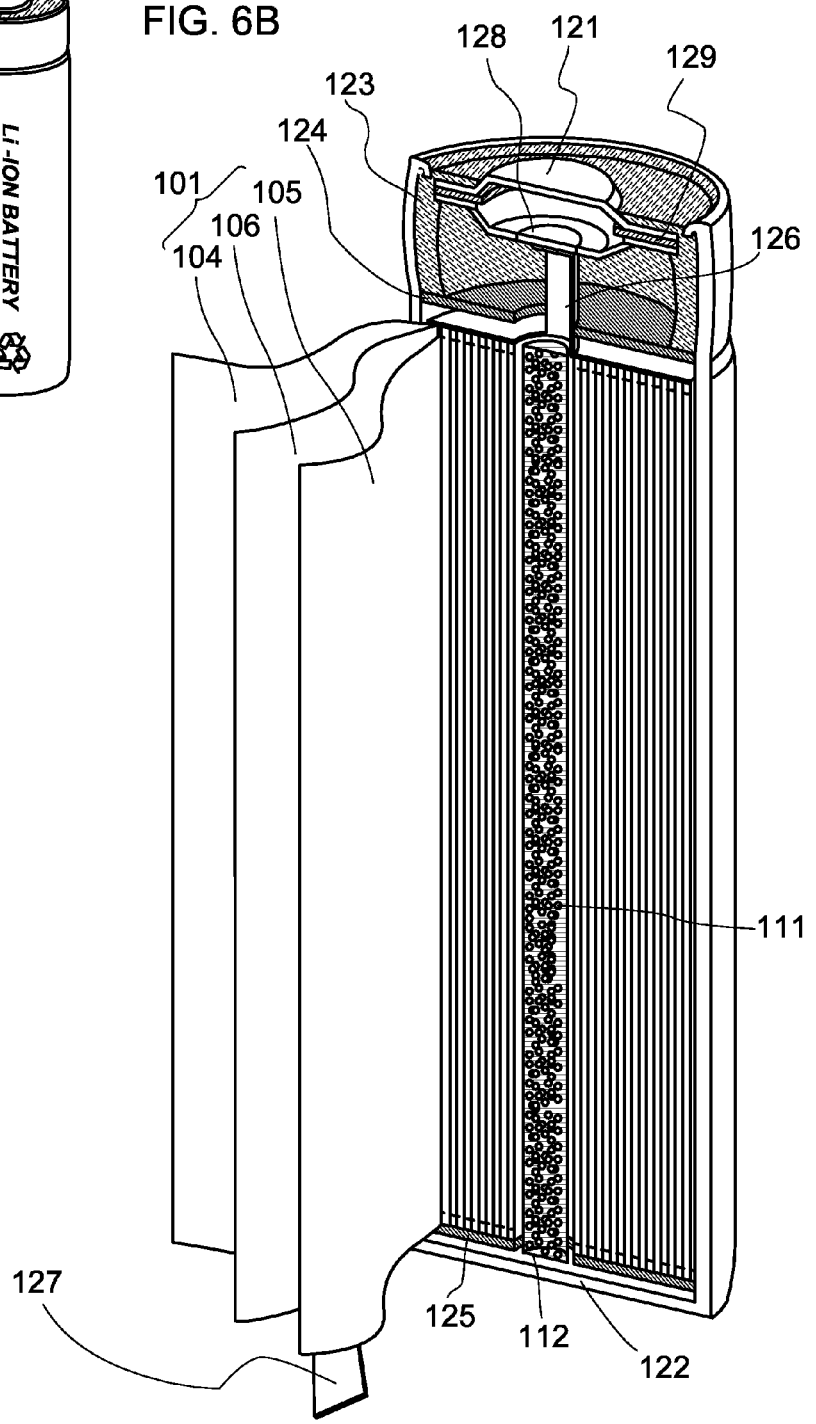

FIG. 6B is a diagram schematically illustrating a cross section of the cylindrical power storage device 100. Inside the battery can 122 having a hollow cylindrical shape, a power storage body 101 in which a strip-like positive electrode 104 and a strip-like negative electrode 105 are wound with a separator 106 provided therebetween is provided. One end of the battery can 122 is close and the other end thereof is open.

Inside the battery can 122, the power storage body 101 is provided between a pair of facing insulating plates 124 and 125. The power storage body 101 is formed by winding the positive electrode 104, the negative electrode 105, and the separator 106. Further, an electrolyte solution is supplied inside the battery can 122 including the power storage body 101.

A positive electrode terminal (positive electrode current collecting lead) 126 is connected to the positive electrode 104, and a negative electrode terminal (negative electrode current collecting lead) 127 is connected to the negative electrode 105. The positive electrode terminal 126 and the negative electrode terminal 127 are resistance-welded to a safety valve mechanism 128 and the bottom of the battery can 122, respectively. The safety valve mechanism 128 is electrically connected to the positive electrode cap 121 via a positive temperature coefficient (PTC) element 129. The safety valve mechanism 128 cuts off electrical connection between the positive electrode cap 121 and the positive electrode 104 when the internal pressure of the battery increases and exceeds a predetermined threshold value. The PTC element 129 is a heat sensitive resistor whose resistance increases as temperature rises, and controls the amount of current by increase in resistance to prevent unusual heat generation. Note that barium titanate (BaTiO$_3$)-based semiconductor ceramic or the like can be used for the PTC element.

Here, a cylindrical separation body 112 is provided in the center portion of the wound power storage body 101, and a plurality of particle-like adsorbents 111 is provided in a space inside the separation body 112. The inside of the separation body 112 is separated from the electrolyte solution, so that the electrolyte solution is not in contact with the adsorbents 111.

A gas generated from the power storage body 101 can permeate the separation body 112 and be adsorbed by the adsorbents 111.

With such a structure, a highly reliable power storage device can be obtained.

The above is the description of this structure example.

The power storage device of one embodiment of the present invention is not limited to the structural examples described above and can have a variety of structures. It is sufficient that the power storage device of one embodiment of the present invention includes, inside the exterior material, at least the adsorbent which is separated by the separation body and is not in contact with the electrolyte solution. Any of power storage devices with a variety of shapes, such as a coin-type power storage device, a laminated power storage device, a cylindrical power storage device, a square-type power storage device, and a stationary-type power storage device, can be used.

The following can be used for the power storage body 101, for example: a secondary battery such as a lithium-ion secondary battery, a lead storage battery, a lithium-ion polymer secondary battery, a nickel hydrogen storage battery, a nickel cadmium storage battery, a nickel iron storage battery, a nickel zinc storage battery, or a zinc-silver oxide storage battery; a secondary flow battery such as a redox flow battery, a zinc chlorine battery, or a zinc bromine battery; a mechanically rechargeable secondary battery such as an aluminum-air battery, a zinc-air battery, or an iron-air battery; or a high temperature operation type secondary battery such as a sodium-sulfur battery or a lithium-iron sulfide battery. Note that without being limited to these, a lithium-ion capacitor may be used for the power storage body 101, for example.

[Components of Power Storage Device]

Described below are the details of portions which can be included in a power storage device. Here, as an example of a power storage device, a non-aqueous secondary battery typified by a lithium-ion secondary battery is described.

[Positive Electrode]

Figure 7A:
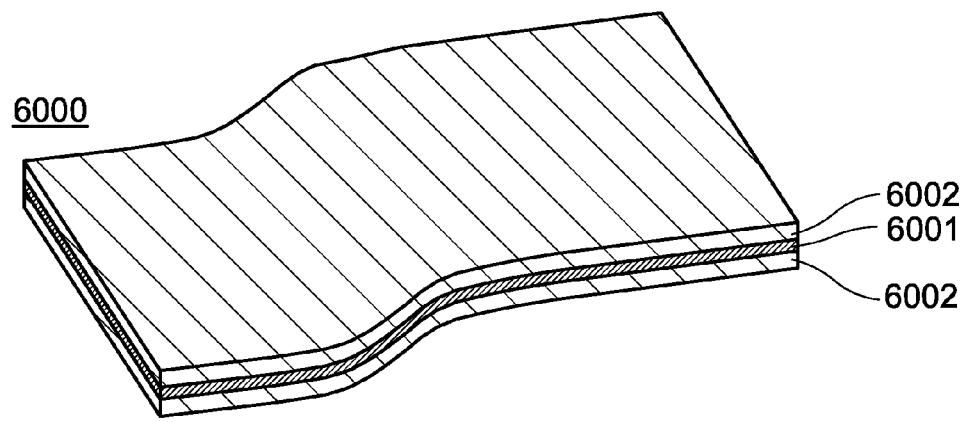
FIGS. 7A and 7B illustrate a positive electrode according to an embodiment.

A positive electrode of the power storage device is described below with reference to FIGS. 7A and 7B.

A positive electrode 6000 includes a positive electrode current collector 6001, a positive electrode active material layer 6002 formed over the positive electrode current collector 6001 by a coating method, a CVD method, a sputtering method, or the like, for example. Although an example of providing the positive electrode active material layer 6002 on both surfaces of the positive electrode current collector 6001 with a sheet shape (or a strip-like shape) is illustrated in FIG. 7A, one embodiment of the present invention is not limited to this example. The positive electrode active material layer 6002 may be provided on one of the surfaces of the positive electrode current collector 6001. Further, although the positive electrode active material layer 6002 is provided entirely over the positive electrode current collector 6001 in FIG. 7A, one embodiment of the present invention is not limited thereto. The positive electrode active material layer 6002 may be provided over part of the positive electrode current collector 6001. For example, a structure may be used in which the positive electrode active material layer 6002 is not provided in a portion where the positive electrode current collector 6001 is connected to the positive electrode.

For the positive electrode current collector 6001, a highly conductive material such as a metal typified by gold, platinum, aluminum, or titanium, or an alloy of any of these metals (e.g., stainless steel) can be used. The positive electrode current collector 6001 can have a foil-like shape, a plate-like shape (sheet-like shape), a net-like shape, a punching-metal shape, an expanded-metal shape, or the like as appropriate. The positive electrode current collector 6001 preferably has a thickness greater than or equal to 10 µm and less than or equal to 30 µm.

Figure 7B:
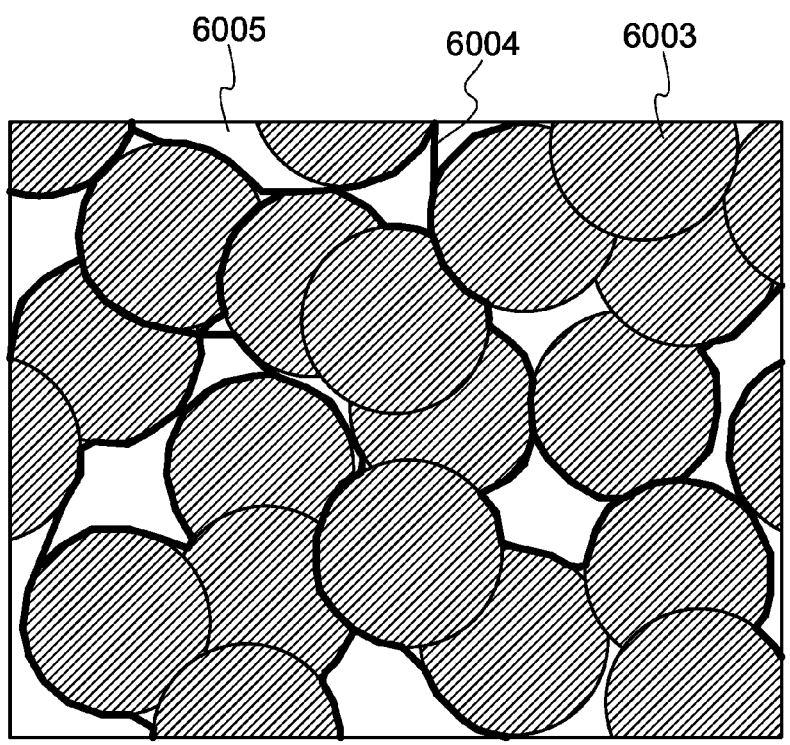

FIG. 7B is a schematic view illustrating the longitudinal cross-sectional view of the positive electrode active material layer 6002. The positive electrode active material layer 6002 includes particles of the positive electrode active material 6003, graphene 6004 as a conductive additive, and a binder 6005.

Examples of the conductive additive are acetylene black (AB), ketjen black, graphite (black lead), and carbon nanotubes in addition to graphene described later. Here, the positive electrode active material layer 6002 using the graphene 6004 is described as an example.

The positive electrode active material 6003 is in the form of particles made of secondary particles having average particle diameter and particle diameter distribution, which is obtained in such a way that material compounds are mixed at a predetermined ratio and baked and the resulting baked product is crushed, granulated, and classified by an appropriate means. For this reason, the positive electrode active material 6003 is schematically illustrated as spheres in FIG. 7B; however, the shape of the positive electrode active material 6003 is not limited to this shape.

As the positive electrode active material 6003, a material into/from which carrier ions such as lithium ions can be inserted and extracted is used.

For example, an olivine-type lithium-containing complex phosphate (LiMPO$_4$ (general formula) (M is one or more of Fe(II), Mn(II), Co(II), and Ni(II))) can be used. Typical examples of the general formula LiMPO$_4$ as the positive electrode active material include LiFePO$_4$, LiNiPO$_4$, LiCoPO$_4$, LiMnPO$_4$, LiFe$_a$Ni$_b$PO$_4$, LiFe$_a$Co$_b$PO$_4$, LiFe$_a$Mn$_b$PO$_4$, LiNi$_a$Co$_b$PO$_4$, LiNi$_a$Mn$_b$PO$_4$ (a+b≤1, 0<a<1, and 0<b<1), LiFe$_c$Ni$_d$Co$_e$PO$_4$, LiFe$_c$Ni$_d$Mn$_e$PO$_4$, LiNi$_c$Co$_d$Mn$_e$PO$_4$ (c+d+e≤1, 0<c<1, 0<d<1, and 0<e<1), and LiFe$_f$Ni$_g$Co$_h$Mn$_i$PO$_4$ (f+g+h+i≤1, 0<f<1, 0<g<1, 0<h<1, and 0<i<1).

Alternatively, as the positive electrode active material particle, a composite silicate represented by a general formula Li$_{(2-j)}$MSiO$_4$ (M is one or more of Fe(II), Mn(II), Co(II), and Ni(II); 0≤j≤2) can be used. Typical examples of Li$_{(2-j)}$MSiO$_4$ (general formula) as the positive electrode active material include compounds such as Li$_{(2-j)}$FeSiO$_4$, Li$_{(2-j)}$NiSiO$_4$, Li$_{(2-j)}$CoSiO$_4$, Li$_{(2-j)}$MnSiO$_4$, Li$_{(2-j)}$Fe$_k$Ni$_l$SiO$_4$, Li$_{(2-j)}$Fe$_k$Co$_l$SiO$_4$, Li$_{(2-j)}$Fe$_k$Mn$_l$SiO$_4$, Li$_{(2-j)}$Ni$_k$Co$_l$SiO$_4$, Li$_{(2-j)}$Ni$_k$Mn$_l$SiO$_4$ (k+l≤1, 0<k<1, and 0<l<1), Li$_{(2-j)}$Fe$_m$Ni$_n$Co$_q$SiO$_4$, Li$_{(2-j)}$Fe$_m$Ni$_n$Mn$_q$SiO$_4$, Li$_{(2-j)}$Ni$_m$Co$_n$Mn$_q$SiO$_4$ (m+n+q≤1, 0<m<1, 0<n<1, and 0<q<1), and Li$_{(2-j)}$Fe$_r$Ni$_s$Co$_t$Mn$_u$SiO$_4$ (r+s+t+u≤1, 0<r<1, 0<s<1, 0<t<1, and 0<u<1).

Further alternatively, a composite oxide with a layered rock-salt crystal structure can be used. Examples of such a composite oxide include a lithium cobalt oxide (LiCoO$_2$); LiNiO$_2$; LiMnO$_2$; Li$_2$MnO$_3$; an NiCo-based composite oxide (a general formula thereof is LiNi$_x$Co$_{1-x}$O$_2$ (0<x<1)) such as LiNi$_{0.8}$Co$_{0.2}$O$_2$; an NiMn-based lithium-containing composite oxide (a general formula thereof is LiNi$_x$Mn$_{1-x}$O$_2$ (0<x<1)) such as LiNi$_{0.5}$Mn$_{0.5}$O$_2$; and an NiMnCo-based lithium-containing composite oxide (also referred to as NMC, and a general formula thereof is LiNi$_x$Mn$_y$Co$_{1-x-y}$O$_2$ (x>0, y>0, x+y<1)) such as LiNi$_{1/3}$Mn$_{1/3}$Co$_{1/3}$O$_2$.

Still further alternatively, for the positive electrode active material 6003, any of various compounds other than the above, for example, an active material having a spinel crystal structure such as LiMn$_2$O$_4$ and an active material having an inverse spinel crystal structure such as LiMVO$_4$ can be used.

In the case where carrier ions are alkali metal ions other than lithium ions or alkaline-earth metal ions, the following may be used as the positive electrode active material 6003: a compound or oxide which is obtained by substituting an alkali metal (e.g., sodium or potassium) or an alkaline-earth metal (e.g., calcium, strontium, barium, beryllium, or magnesium) for lithium in any of the above-described compounds or oxides.

Note that although not illustrated, a carbon layer may be provided on a surface of the positive electrode active material 6003. With a carbon layer, conductivity of an electrode can be increased. The positive electrode active material 6003 can be coated with the carbon layer by mixing a carbohydrate such as glucose at the time of baking the positive electrode active material.

In addition, the graphene 6004 which is added to the positive electrode active material layer 6002 as a conductive additive can be formed by performing reduction treatment on graphene oxide.

Here, graphene in this specification includes single-layer graphene or multilayer graphene including two to a hundred layers. The single-layer graphene refers to a sheet of one atomic layer of carbon molecules having π bonds. Further, graphene oxide in this specification refers to a compound formed by oxidation of graphene. When graphene oxide is reduced to form graphene, oxygen contained in the graphene oxide is not entirely extracted and part of the oxygen remains in the graphene in some cases. When the graphene contains oxygen, the ratio of the oxygen measured by X-ray photoelectron spectroscopy (XPS) in the graphene is higher than or equal to 2 atomic % and lower than or equal to 20 atomic %, preferably higher than or equal to 3 atomic % and lower than or equal to 15 atomic %.

In the case of multilayer graphene including graphene obtained by reducing graphene oxide, the interlayer distance of the graphene is greater than or equal to 0.34 nm and less than or equal to 0.5 nm, preferably greater than or equal to 0.38 nm and less than or equal to 0.42 nm, more preferably greater than or equal to 0.39 nm and less than or equal to 0.41 nm. In general graphite, the interlayer distance of single-layer graphene is 0.34 nm. Since the interlayer distance in the graphene used for the power storage device of one embodiment of the present invention is longer than that in the general graphite, carrier ions can easily transfer between layers of the graphene in the multilayer graphene.

Graphene oxide can be formed by an oxidation method called a Hummers method, for example.

The Hummers method is as follows: a sulfuric acid solution of potassium permanganate, a hydrogen peroxide solution, and the like are mixed into a graphite powder to cause oxidation reaction; thus, a dispersion liquid including graphite oxide is formed. Through the oxidation of carbon in graphite, functional groups such as an epoxy group, a carbonyl group, a carboxyl group, or a hydroxyl group are bonded in the graphite oxide. Accordingly, the interlayer distance between a plurality of pieces of graphene in the graphite oxide is longer than that in the graphite, so that the graphite oxide can be easily separated into thin pieces by interlayer separation. Then, ultrasonic vibration is applied to the mixed solution containing the graphite oxide, so that the graphite oxide whose interlayer distance is long can be cleaved to separate graphene oxide and to form a dispersion liquid containing graphene oxide. The solvent is removed from the dispersion liquid containing the graphene oxide, so that powdery graphene oxide can be obtained.

Note that the method for forming graphene oxide is not limited to the Hummers method using a sulfuric acid solution of potassium permanganate; for example, the Hummers method using nitric acid, potassium chlorate, nitric acid sodium, potassium permanganate, or the like or a method for forming graphene oxide that does not use the Hummers method may be employed as appropriate.

Graphite oxide may be separated into thin pieces by application of ultrasonic vibration, by irradiation with microwaves, radio waves, or thermal plasma, or by application of physical stress.

The formed graphene oxide includes an epoxy group, a carbonyl group, a carboxyl group, a hydroxyl group, or the like. In graphene oxide, oxygen in a functional group is negatively charged in a polar solvent typified by NMP (also referred to as N-methylpyrrolidone, 1-methyl-2-pyrrolidone, N-methyl-2-pyrrolidone, or the like); therefore, while interacting with NMP, the graphene oxide repels other graphene oxide and is hardly aggregated. For this reason, in a polar solvent, graphene oxide can be easily dispersed uniformly.

The length of one side (also referred to as a flake size) of the graphene oxide is greater than or equal to 50 nm and less than or equal to 100 μm, preferably greater than or equal to 800 nm and less than or equal to 20 μm.

As illustrated in the cross-sectional view of the positive electrode active material layer 6002 in FIG. 7B, the plurality of particles of the positive electrode active material 6003 is coated with a plurality of pieces of the graphene 6004. The sheet-like graphene 6004 is connected to the plurality of particles of the positive electrode active material 6003. In particular, since the graphene 6004 has the sheet shape, surface contact can be made in such a way that part of surfaces of the particles of the positive electrode active material 6003 are wrapped with the graphene 6004. Unlike a conductive additive in the form of particles such as acetylene black, which makes point contact with a positive electrode active material, the graphene 6004 is capable of surface contact with low contact resistance; accordingly, the electron conductivity between the particles of the positive electrode active material 6003 and the graphene 6004 can be improved without an increase in the amount of a conductive additive.

Further, surface contact is made between the plurality of pieces of the graphene 6004. This is because graphene oxide with extremely high dispersibility in a polar solvent is used for the formation of the graphene 6004. The solvent is removed by volatilization from a dispersion medium in which the graphene oxide is uniformly dispersed, and the graphene oxide is reduced to give graphene; hence, pieces of the graphene 6004 remaining in the positive electrode active material layer 6002 are partly overlapped with each other and dispersed such that surface contact is made, thereby forming a path for electron conduction.

Further, some pieces of the graphene 6004 are arranged three-dimensionally between the particles of the positive electrode active material 6003. Furthermore, the graphene 6004 is an extremely thin film (sheet) made of a single layer of carbon molecules or stacked layers thereof and hence covers and is in contact with part of the surfaces of the particles of the positive electrode active material 6003 in such a way as to fit these surfaces. A portion of the graphene 6004 which is not in contact with the particles of the positive electrode active material 6003 is warped between the plurality of particles of the positive electrode active material 6003 and crimped or stretched.

Consequently, a network for electron conduction is formed in the positive electrode 6000 owing to the pieces of the graphene 6004. Therefore, a path for electric conduction between the particles of the positive electrode active material 6003 is maintained. As described above, the graphene, whose raw material is the graphene oxide and which is formed by reduction performed after a paste is formed, is used as a conductive additive, which enables the positive electrode active material layer 6002 to have high electron conductivity.

The ratio of the positive electrode active material 6003 to the positive electrode active material layer 6002 can be increased because it is not necessary to increase the added amount of the conductive additive in order to increase contact points between the positive electrode active material 6003 and the graphene 6004. Accordingly, the discharge capacity of the secondary battery can be increased.

The average particle diameter of the primary particle of the positive electrode active material 6003 is less than or equal to 500 nm, preferably greater than or equal to 50 nm and less than or equal to 500 nm. To make surface contact with the plurality of particles of the positive electrode active material 6003, the length of one side of the graphene 6004 is greater than or equal to 50 nm and less than or equal to 100 µm, preferably greater than or equal to 800 nm and less than or equal to 20 µm.

Examples of the binder 6005 included in the positive electrode active material layer 6002 are polyimide, polytetrafluoroethylene, polyvinyl chloride, ethylene-propylene-diene polymer, styrene-butadiene rubber, acrylonitrile-butadiene rubber, fluorine rubber, polyvinyl acetate, polymethyl methacrylate, polyethylene, and nitrocellulose, in addition to polyvinylidene fluoride (PVDF) which is a typical one.

The above-described positive electrode active material layer 6002 preferably includes the positive electrode active material 6003 at greater than or equal to 90 wt % and less than or equal to 94 wt %, the graphene 6004 as the conductive additive at greater than or equal to 1 wt % and less than or equal to 5 wt %, and the binder 6005 at greater than or equal to 1 wt % and less than or equal to 5 wt % with respect to the total weight of the positive electrode active material layer 6002.

[Negative Electrode]

Figure 8A:
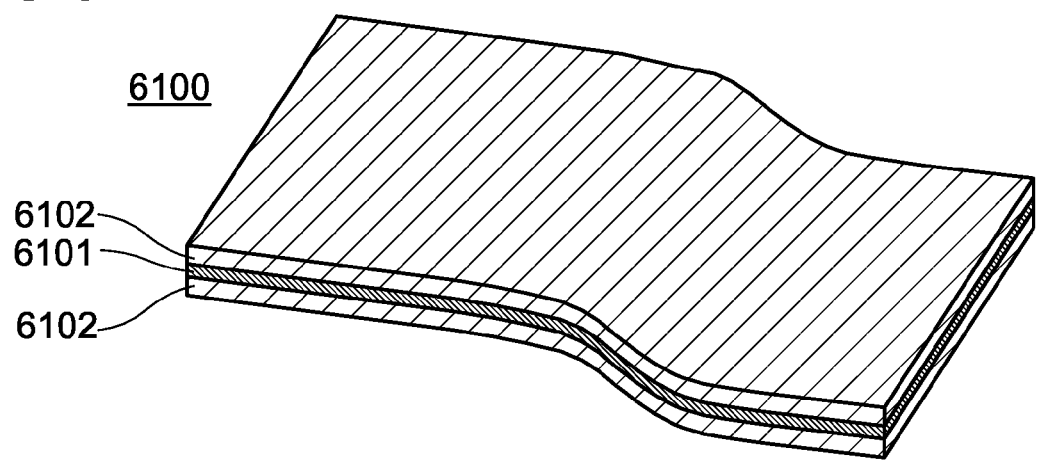
FIGS. 8A and 8B illustrate a negative electrode according to an embodiment.

A negative electrode of the power storage device is described below with reference to FIGS. 8A and 8B.

A negative electrode 6100 includes a negative electrode current collector 6101 and a negative electrode active material layer 6102 formed over the negative electrode current collector 6101 by a coating method, a CVD method, a sputtering method, or the like, for example. Although an example of providing the negative electrode active material layer 6102 on both surfaces of the negative electrode current collector 6101 with a sheet shape (or a strip-like shape) is illustrated in FIG. 8A, one embodiment of the present invention is not limited to this example. The negative electrode active material layer 6102 may be provided on one of the surfaces of the negative electrode current collector 6101. Further, although the negative electrode active material layer 6102 is provided entirely over the negative electrode current collector 6101 in FIG. 8A, one embodiment of the present invention is not limited thereto. The negative electrode active material layer 6102 may be provided over part of the negative electrode current collector 6101. For example, a structure may be employed in which the negative electrode active material layer 6102 is not provided in a portion where the negative electrode current collector 6101 is connected to a negative electrode terminal.

The negative electrode current collector 6101 can be formed using a material, which has high conductivity and is not alloyed with carrier ions such as lithium ions, e.g., a metal typified by gold, platinum, zinc, iron, copper, aluminum, or titanium, or an alloy of any of these metals (stainless steel, for example). Further, a metal element which forms silicide by reacting with silicon can be used. Examples of a metal which forms silicide by reacting with silicon include zirconium, titanium, hafnium, vanadium, niobium, tantalum, chromium, molybdenum, tungsten, cobalt, nickel, and the like. The negative electrode current collector 6101 can have a foil-like shape, a plate-like shape (sheet-like shape), a net-like shape, a punching-metal shape, an expanded-metal shape, or the like, as appropriate. The negative electrode current collector 6101 preferably has a thickness of greater than or equal to 10 µm and less than or equal to 30 µm.

Figure 8B:
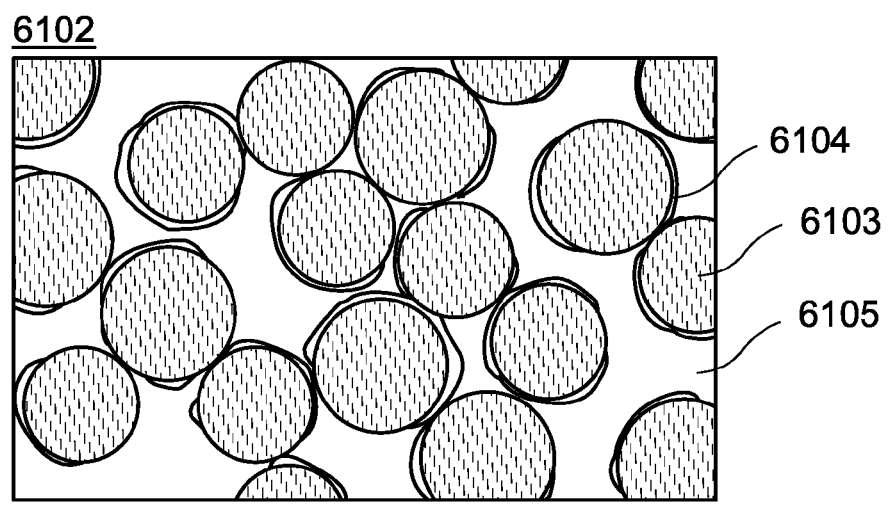

FIG. 8B is a schematic view of part of a cross-section of the negative electrode active material layer 6102. Although an example of the negative electrode active material layer 6102 including the negative electrode active material 6103 and the binder 6105 is shown here, one embodiment of the present invention is not limited to this example. It is sufficient that the negative electrode active material layer 6102 includes at least the negative electrode active material 6103.

There is no particular limitation on the material of the negative electrode active material 6103 as long as it is a material with which a metal can be dissolved and precipitated or a material into/from which metal ions can be inserted and extracted. Other than a lithium metal, graphite, which is a carbon material generally used in the field of power storage, can also be used as the negative electrode active material 6103. Examples of graphite are low crystalline carbon such as soft carbon and hard carbon and high crystalline carbon such as natural graphite, kish graphite, pyrolytic carbon, mesophase pitch based carbon fiber, meso-carbon microbeads (MCMB), mesophase pitches, and petroleum-based or coal-based coke.

Other than the above materials, a material which enables charge-discharge reaction by alloying and dealloying reaction with carrier ions can be used as the negative electrode active material 6103. For example, a material containing at least one of Mg, Ca, Al, Si, Ge, Sn, Pb, As, Sb, Bi, Ag, Au, Zn, Cd, Hg, In, etc. can be used. Such a material has higher capacity than carbon. In particular, silicon has a significantly high theoretical capacity of 4200 mAh/g. For this reason, silicon is preferably used for the negative electrode active material 6103.

Although the negative electrode active material 6103 is illustrated as a particulate substance in FIG. 8B, the shape of the negative electrode active material 6103 is not limited thereto. The negative electrode active material 6103 can have a given shape such as a plate shape, a rod shape, a cylindrical shape, a powder shape, or a flake shape. Further, the negative electrode active material 6103 may have unevenness or fine unevenness on its surface, or may be porous.

The negative electrode active material layer 6102 may be formed by a coating method in the following manner: a conductive additive (not illustrated) or a binder is added to the negative electrode active material 6103 to form a negative electrode paste; and the negative electrode paste is applied on the negative electrode current collector 6101 and dried.

Note that the negative electrode active material layer 6102 may be predoped with lithium. As a predoping method, a sputtering method may be used to form a lithium layer on a surface of the negative electrode active material layer 6102. Alternatively, the negative electrode active material layer 6102 can be predoped with lithium by providing lithium foil on the surface thereof.

Further, graphene (not illustrated) is preferably formed on a surface of the negative electrode active material 6103. In the case of using silicon as the negative electrode active material 6103, the volume of silicon is greatly changed due to occlusion and release of carrier ions in charge-discharge cycles. Therefore, adhesion between the negative electrode current collector 6101 and the negative electrode active material layer 6102 is decreased, resulting in degradation of battery characteristics caused by charging and discharging. In view of this, graphene is preferably formed on a surface of the negative electrode active material 6103 containing silicon because even when the volume of silicon is changed in charge-discharge cycles, decrease in adhesion between the negative electrode current collector 6101 and the negative electrode active material layer 6102 can be regulated, which makes it possible to reduce degradation of battery characteristics.

Graphene formed on the surface of the negative electrode active material 6103 can be formed by reducing graphene oxide in a similar manner to that of the method for forming the positive electrode. As the graphene oxide, the above-described graphene oxide can be used.

Further, a coating film 6104 may be formed on a surface of the negative electrode active material 6103. A coating film formed by decomposition or the like of an electrolyte solution or the like in charging cannot release electric charges used at the formation, and therefore forms irreversible capacity. However, when the coating film such as oxide is provided in advance on the surface of the negative electrode active material 6103, generation of the irreversible capacity can be inhibited or prevented.

As the coating film 6104 coating the negative electrode active material 6103, an oxide film of any one of niobium, titanium, vanadium, tantalum, tungsten, zirconium, molybdenum, hafnium, chromium, aluminum, and silicon or an oxide film containing any one of these elements and lithium can be used. The coating film 6104 is denser than a conventional coating film formed on a surface of a negative electrode due to a decomposition product of an electrolyte solution.

For example, niobium oxide ($Nb_2O_5$) has a low electric conductivity of $10^{-9}$ S/cm and a high insulating property. For this reason, a niobium oxide film inhibits electrochemical decomposition reaction between the negative electrode active material and the electrolyte solution. On the other hand, niobium oxide has a lithium diffusion coefficient of $10^{-9}$ cm$^2$/sec and high lithium ion conductivity. Therefore, niobium oxide can transmit lithium ions.

A sol-gel method can be used to coat the negative electrode active material 6103 with the coating film 6104, for example. The sol-gel method is a method for forming a thin film in such a manner that a solution of metal alkoxide, a metal salt, or the like is changed into a gel, which has lost its fluidity, by hydrolysis reaction and polycondensation reaction and the gel is baked. Since a thin film is formed from a liquid phase in the sol-gel method, raw materials can be mixed uniformly on the molecular scale. For this reason, by adding a negative electrode active material such as graphite to a raw material of the metal oxide film which is a solvent, the active material can be easily dispersed into the gel. In such a manner, the coating film 6104 can be formed on the surface of the negative electrode active material 6103.

[Electrolyte Solution]

As a solvent for the electrolyte solution used in the power storage device, an aprotic organic solvent is preferably used. For example, one of ethylene carbonate (EC), propylene carbonate (PC), butylene carbonate, chloroethylene carbonate, vinylene carbonate, γ-butyrolactone, γ-valerolactone, dimethyl carbonate (DMC), diethyl carbonate (DEC), ethyl methyl carbonate (EMC), methyl formate, methyl acetate, methyl butyrate, 1,3-dioxane, 1,4-dioxane, dimethoxyethane (DME), dimethyl sulfoxide, diethyl ether, methyl diglyme, acetonitrile, benzonitrile, tetrahydrofuran, sulfolane, and sultone can be used, or two or more of these solvents can be used in an appropriate combination in an appropriate ratio.

With the use of a gelled high-molecular material as the solvent for the electrolyte solution, safety against liquid leakage and the like is improved. Further, the power storage device can be thinner and more lightweight. Typical examples of gelled high-molecular materials are a silicone gel, an acrylic gel, an acrylonitrile gel, polyethylene oxide, polypropylene oxide, and a fluorine-based polymer.

Alternatively, the use of one or more of ionic liquids (room temperature molten salts) which are less likely to burn and volatilize as the solvent for the electrolyte solution can prevent the power storage device from exploding or catching fire even when the power storage device internally shorts out or the internal temperature increases due to overcharging or the like.

In the case of using a lithium ion as a carrier ion, as an electrolyte dissolved in the above-described solvent, one of lithium salts such as $LiPF_6$, $LiClO_4$, $LiAsF_6$, $LiBF_4$, $LiAlCl_4$, $LiSCN$, $LiBr$, $LiI$, $Li_2SO_4$, $Li_2B_{10}Cl_{10}$, $Li_2B_{12}Cl_{12}$, $LiCF_3SO_3$, $LiC_4F_9SO_3$, $LiC(CF_3SO_2)_3$, $LiC(C_2F_5SO_2)_3$, $LiN(CF_3SO_2)_2$, $LiN(C_4F_9SO_2)$ $(CF_3SO_2)$, and $LiN(C_2F_5SO_2)_2$ can be used, or two or more of these lithium salts can be used in an appropriate combination in an appropriate ratio.

[Separator]

As the separator of the power storage device, a porous insulator such as cellulose, polypropylene (PP), polyethylene (PE), polybutene, nylon, polyester, polysulfone, polyacrylonitrile, polyvinylidene fluoride, or tetrafluoroethylene can be used. Further, nonwoven fabric of a glass fiber or the like, or a diaphragm in which a glass fiber and a polymer fiber are mixed may also be used.

[Exterior Material]

For the exterior material, a metal having corrosion resistance to an electrolyte solution, such as nickel, aluminum, or titanium, an alloy of such a metal, or an alloy of such a metal and another metal (e.g., stainless steel or the like) can be used. Alternatively, the exterior material is preferably covered with nickel, aluminum, or the like in order to prevent corrosion caused by the electrolyte solution.

As the exterior material in the laminated power storage device, for example, a laminate film having a three-layer structure where a highly flexible metal thin film of aluminum, stainless steel, copper, nickel, or the like is provided over a film formed of a material such as polyethylene, polypropylene, polycarbonate, ionomer, or polyamide, and an insulating synthetic resin film of a polyamide resin, a polyester resin, or the like is provided as the outer surface of the exterior material over the metal thin film can be used. With such a three-layer structure, permeation of an electrolyte solution and a gas can be blocked and an insulating property and resistance to the electrolyte solution can be obtained.

The above is the description of the portions which can be included in the power storage device.

The power storage device described in this embodiment includes, inside the exterior material, the adsorbent which is prevented from being in contact with the electrolyte solution by the separation body. The separation body is permeable to a gas. Thus, a gas generated from the power storage body can permeate the separation body and be adsorbed by the adsorbent. Consequently, malfunctions due to the gas can be inhibited, and thus, a highly reliable power storage device can be obtained.

This embodiment can be combined with any of the other embodiments disclosed in this specification as appropriate.

Embodiment 2

In this embodiment, a power storage device including an electric circuit and the like is described.

FIGS. 9A to 9D illustrate an example of a power storage device in which the above-described rectangular secondary battery is provided with an electric circuit and the like. In a power storage device 6600 illustrated in FIGS. 9A and 9B, a wound body 6601 is stored inside a battery can 6604. The wound body 6601 includes a terminal 6602 and a terminal 6603, and is impregnated with an electrolyte solution inside the battery can 6604. It is preferable that the terminal 6603 be in contact with the battery can 6604, and the terminal 6602 be insulated from the battery can 6604 with the use of an insulating member or the like. A metal material such as aluminum or a resin material can be used for the battery can 6604.

Figure 9A:
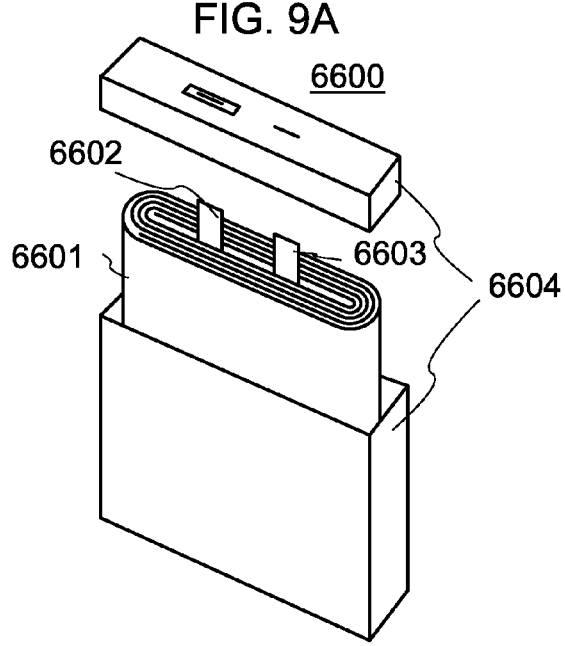
FIGS. 9A to 9D illustrate a power storage device according to an embodiment.
Figure 9B:
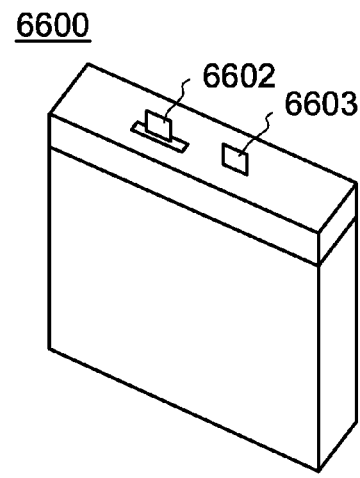
Figure 9C:
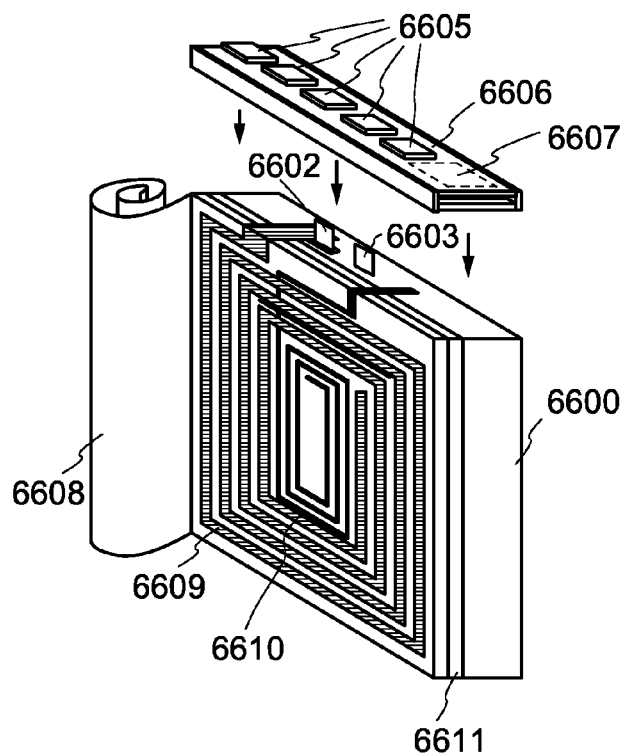
Figure 9D:
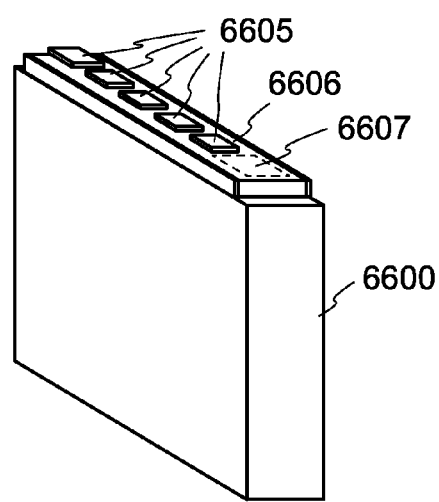

Further, as illustrated in FIG. 9B, the power storage device 6600 can be provided with an electric circuit and the like. FIGS. 9C and 9D illustrate an example of providing the power storage device 6600 with a circuit board 6606 in which an electric circuit and the like are provided, an antenna 6609, an antenna 6610, and a label 6608.

The circuit board 6606 includes an electric circuit 6607, terminals 6605, and the like. As the circuit board 6606, a printed circuit board (PCB) can be used, for example. When the printed circuit board is used as the circuit board 6606, electronic components such as a resistor, a capacitor, a coil (an inductor), and a semiconductor integrated circuit (IC) are mounted over the printed circuit board and connected, whereby the electric circuit 6607 can be formed. As well as the above-described electronic components, a variety of components, for example, a temperature sensing element such as a thermistor, a fuse, a filter, a crystal oscillator, and an electromagnetic compatibility (EMC) component can be mounted.

Here, a circuit including a transistor in which an oxide semiconductor is used in a channel formation region and the like and leakage current in an off state is extremely reduced can be used as the semiconductor integrated circuit (IC). Thus, power consumption of the electric circuit 6607 can be greatly reduced.

The electric circuit 6607 including these electronic components can function as a monitoring circuit for preventing overcharge or overdischarge of the power storage device 6600, a protection circuit against overcurrent, or the like.

The terminals 6605 included in the circuit board 6606 are connected to the terminal 6602, the terminal 6603, the antenna 6609, the antenna 6610, and the electric circuit 6607. Although the number of the terminals 6605 is five in FIGS. 9C and 9D, the number is not limited thereto, and may be a given number. With the use of the terminals 6605, the power storage device 6600 can be charged and discharged, and further, a signal can be sent and received to/from an electrical device including the power storage device 6600.

The antenna 6609 and the antenna 6610 can be used for transmitting and receiving electric power and a signal to/from the outside of the power storage device, for example. One or both of the antenna 6609 and the antenna 6610 are electrically connected to the electric circuit 6607 to allow the electric circuit 6607 to control the transmission and reception of electric power and a signal to/from the outside. Alternatively, one or both of the antenna 6609 and the antenna 6610 are electrically connected to the terminals 6605 to allow a control circuit of the electrical device including the power storage device 6600 to control the transmission and reception of electric power and a signal to/from the outside.

Note that although FIGS. 9C and 9D illustrate an example of the power storage device 6600 provided with two kinds of antenna, a variety of antennas may be provided or a structure where an antenna is not provided may be employed.

In FIGS. 9C and 9D, the antenna 6609 and the antenna 6610 each have a coil shape; however, without limitation thereon, a linear antenna or a flat plate antenna may be used, for example. Further, a planar antenna, an aperture antenna, a traveling-wave antenna, an EH antenna, a magnetic-field antenna, or a dielectric antenna may be used.

Note that an electromagnetic induction method, a magnetic resonance method, an electric wave method, or the like can be used for transmitting and receiving electric power wirelessly (also referred to as contactless power transmission, non-contact power transmission, wireless power supply, or the like).

The line width of the antenna 6609 is preferably larger than that of the antenna 6610. This makes it possible to increase the amount of electric power received by the antenna 6609.

In addition, a layer 6611 is provided between the antennas 6609 and 6610 and the power storage device 6600. The layer 6611 has a function of preventing shielding of an electric field or a magnetic field due to the wound body 6601, for example. In this case, a magnetic substance can be used for the layer 6611, for example. Alternatively, the layer 6611 may be a shielding layer.

Note that the antenna 6609 and the antenna 6610 can be used for a purpose which is different from the purpose of transmitting and receiving electric power or a signal to/from the outside. For example, when the electrical device including the power storage device 6600 does not include an antenna, the antenna 6609 and the antenna 6610 enable wireless communication with the electrical device.

This embodiment can be combined with any of the other embodiments disclosed in this specification as appropriate.

Embodiment 3

In this embodiment, an electrical device including a power storage device of one embodiment of the present invention is described.

[Electrical Device]

Here, "electrical devices" refer to all general industrial products including portions which operate by electric power. Electrical devices are not limited to consumer products such as home electrical products and also include products for various uses such as business use, industrial use, and military use in their category.

Examples of electrical devices each using the power storage device of one embodiment of the present invention are as follows: display devices of televisions, monitors, and the like, lighting devices, desktop personal computers, laptop personal computers, word processors, image reproduction devices which reproduce still images or moving images stored in recording media such as digital versatile discs (DVDs), portable or stationary music reproduction devices such as compact disc (CD) players and digital audio players, portable or stationary radio receivers, recording reproduction devices such as tape recorders and IC recorders (voice recorders), headphone stereos, stereos, remote controls, clocks such as table clocks and wall clocks, cordless phone handsets, transceivers, mobile phones, car phones, portable or stationary game machines, pedometers, calculators, portable information terminals, electronic notebooks, e-book readers, electronic translators, audio input devices such as microphones, cameras such as still cameras and video cameras, toys, electric shavers, electric toothbrushes, high-frequency heating appliances such as microwave ovens, electric rice cookers, electric washing machines, electric vacuum cleaners, water heaters, electric fans, hair dryers, air-conditioning systems such as humidifiers, dehumidifiers, and air conditioners, dishwashers, dish dryers, clothes dryers, futon dryers, electric refrigerators, electric freezers, electric refrigerator-freezers, freezers for preserving DNA, flashlights, electric power tools, smoke detectors, and a health equipment and a medical equipment such as hearing aids, cardiac pacemakers, portable X-ray equipments, radiation counters, electric massagers, and dialyzers. The examples also include industrial equipment such as guide lights, traffic lights, meters such as gas meters and water meters, belt conveyors, elevators, escalators, automatic vending machines, automatic ticket machine, cash dispensers (CD), automated teller machines (ATM), digital signage, industrial robots, radio relay stations, mobile phone base stations, power storage systems, and power storage device for leveling the amount of power supply and smart grid. In addition, moving objects (transporters) driven by an electric motor using electric power from a power storage device are also included in the category of the electrical devices. Examples of the moving objects are electric vehicles (EV), hybrid electric vehicles (HEV) which include both an internal-combustion engine and a motor, plug-in hybrid electric vehicles (PHEV), tracked vehicles in which caterpillar tracks are substituted for wheels of these vehicles, agricultural machines, motorized bicycles including motor-assisted bicycles, motorcycles, electric wheelchairs, electric carts, boats or ships, submarines, aircrafts such as fixed-wing aircraft and rotary-wing aircraft, rockets, artificial satellites, space probes, planetary probes, and spacecrafts.

In the electrical devices, the power storage device of one embodiment of the present invention can be used as a main power source for supplying enough electric power for almost the whole power consumption. Alternatively, in the electrical devices, the power storage device of one embodiment of the present invention can be used as an uninterruptible power source which can supply power to the electrical devices when the supply of power from the main power source or a commercial power source is stopped. Further alternatively, in the electrical devices, the power storage device of one embodiment of the present invention can be used as an auxiliary power source for supplying electric power to the electrical devices at the same time as the power supply from the main power source or a commercial power source.

[Example of Electric Power Network]

The electrical devices may each include a power storage device or may be connected wirelessly or with a wiring to one or more of power storage devices and a control device controlling a network of an electric power system of these devices to form an electric power network. The electric power network controlled by the control device can improve usage efficiency of electric power in the whole network.

Figure 10A:
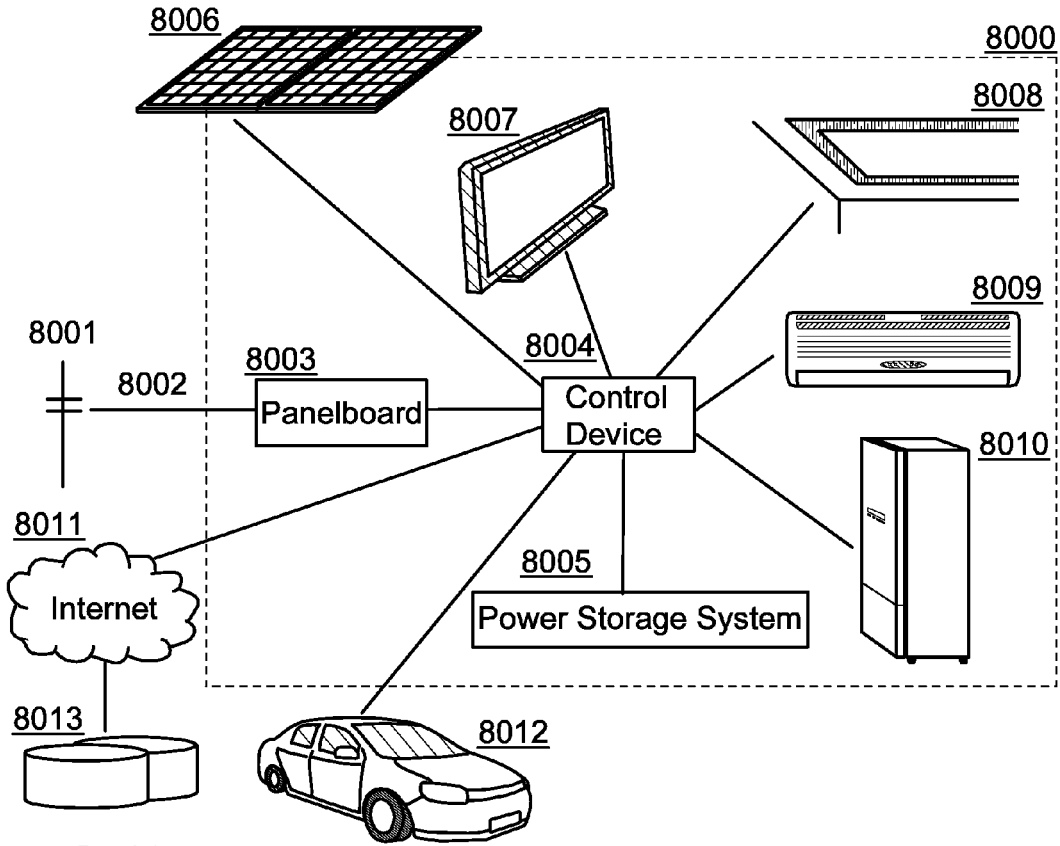
FIGS. 10A to 10C illustrate a power storage device according to an embodiment.

FIG. 10A illustrates an example of a home energy management system (HEMS) in which a plurality of home appliances, a control device, a power storage device, and the like are connected in a house. Such a system makes it possible to check easily the power consumption of the whole house. In addition, the plurality of home appliances can be operated with a remote control. Further, automatic control of the home appliances with a sensor or the control device can also contribute to low power consumption.

A panelboard 8003 set in a house 8000 is connected to an electric power system 8001 through a service wire 8002. The panelboard 8003 supplies AC power which is electric power supplied from a commercial power source through the service wire 8002 to each of the plurality of home appliances. A control device 8004 is connected to the panelboard 8003 and also connected to the plurality of home appliances, a power storage system 8005, a solar power generation system 8006, and the like. Further, the control device 8004 can also be connected to an electric vehicle 8012 which is parked outside the house 8000 or the like and operates independently of the panelboard 8003.

The control device 8004 connects the panelboard 8003 to the plurality of home appliances to form a network, and controls the plurality of home appliances connected to the network.

In addition, the control device 8004 is connected to Internet 8011 and thus can be connected to a management server 8013 through the Internet 8011. The management server 8013 receives data on the status of electric power usage of users and therefore can create a database and can provide the users with a variety of services based on the database. Further, as needed, the management server 8013 can provide the users with data on electric power charge for a corresponding time zone, for example. On the basis of the data, the control device 8004 can set an optimized usage pattern in the house 8000.

Examples of the plurality of home appliances are a display device 8007, a lighting device 8008, an air-conditioning system 8009, and an electric refrigerator 8010 which are illustrated in FIG. 10A. However, the plurality of home appliances are not limited to these examples, and refer to a variety of electrical devices which can be set inside a house, such as the above-described electrical devices.

In a display portion of the display device 8007, a semiconductor display device such as a liquid crystal display device, a light-emitting device including a light-emitting element, e.g., an organic electroluminescent (EL) element, in each pixel, an electrophoretic display device, a digital micromirror device (DMD), a plasma display panel (PDP), or a field emission display (FED) is provided, for example. A display device functioning as a display device for displaying information, such as a display device for TV broadcast reception, a personal computer, advertisement, and the like, is included in the category of the display device 8007.

The lighting device 8008 includes an artificial light source which generates light artificially by utilizing electric power in its category. Examples of the artificial light source are an incandescent lamp, a discharge lamp such as a fluorescent lamp, and a light-emitting element such as a light emitting diode (LED) and an organic EL element. Although being provided on a ceiling in FIG. 10A, the lighting device 8008 may be installation lighting provided on a wall, a floor, a window, or the like or desktop lighting.

The air-conditioning system 8009 has a function of adjusting an indoor environment such as temperature, humidity, and air cleanliness. FIG. 10A illustrates an air conditioner as an example. The air conditioner includes an indoor unit in which a compressor, an evaporator, and the like are integrated and an outdoor unit (not illustrated) in which a condenser is incorporated, or an integral unit thereof.

The electric refrigerator 8010 is an electrical device for the storage of food and the like at low temperature and includes a freezer for freezing at 0° C. or lower. A refrigerant in a pipe which is compressed by a compressor absorbs heat when vaporized, and thus inside the electric refrigerator 8010 is cooled.

The plurality of home appliances may each include a power storage device or may use electric power supplied from the power storage system 8005 or the commercial power source without including the power storage device. By using a power storage device as an uninterruptible power source, the plurality of home appliances each including the power storage device can be used even when electric power cannot be supplied from the commercial power source due to power failure or the like.

In the vicinity of a terminal for power supply in each of the above-described home appliances, an electric power sensor such as a current sensor can be provided. Data obtained with the electric power sensor is sent to the control device 8004, which makes it possible for users to check the used amount of electric power of the whole house. In addition, on the basis of the data, the control device 8004 can determine the distribution of electric power supplied to the plurality of home appliances, resulting in the efficient or economical use of electric power in the house 8000.

In a time zone when the usage rate of electric power which can be supplied from the commercial power source is low, the power storage system 8005 can be charged with electric power from the commercial power source. Further, with the use of the solar power generation system 8006, the power storage system 8005 can be charged during the daytime. Note that an object to be charged is not limited to the power storage system 8005, and a power storage device included in the electric vehicle 8012 and the power storage devices included in the plurality of home appliances which are connected to the control device 8004 may each be the object to be charged.

Electric power stored in a variety of power storage devices in such a manner is efficiently distributed by the control device 8004, resulting in the efficient or economical use of electric power in the house 8000.

As an example of controlling the electric power network, the example of controlling an electric power network on a house scale is described above; however, the scale of the electric power network is not limited thereto. An electric power network on an urban scale or a national scale (also referred to as a smart grid) can be created by a combination of a control device such as a smart meter and a communication network. Further, a microgrid which is on a scale of a factory or an office and includes an energy supply source and a plant consuming electric power as units can be constructed.

[Example of Electrical Device (Example of Electric Vehicle)]

Next, as an example of the electrical devices, a moving object is described with reference to FIGS. 10B and 10C. The power storage device of one embodiment of the present invention can be used as a power storage device for controlling the moving object.

Figure 10B:
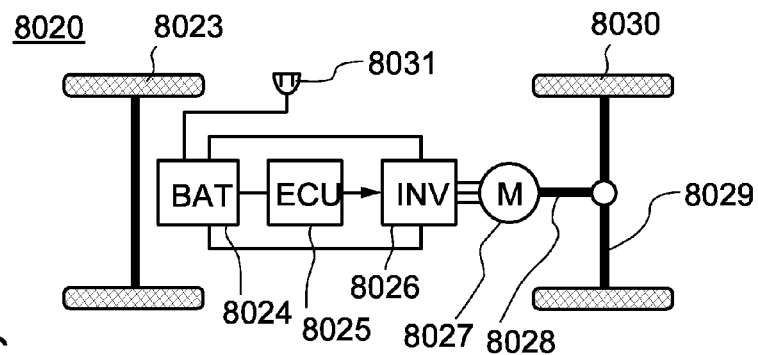
Figure 10C:
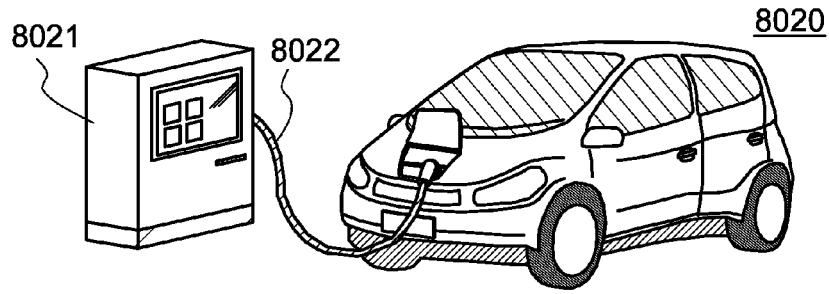

FIG. 10B illustrates an example of a structure inside an electric vehicle. An electric vehicle 8020 includes a power storage device 8024 that can be charged and discharged. Output of electric power of the power storage device 8024 is adjusted by an electronic control unit (ECU) 8025 so that the electric power is supplied to a drive motor unit 8027 through an inverter unit 8026. The inverter unit 8026 can convert DC power input from the power storage device 8024 into three phase AC power, can adjust the voltage, current, and frequency of the converted AC power, and can output the AC power to the drive motor unit 8027.

Thus, when a driver presses an accelerator pedal (not illustrated), the drive motor unit 8027 works, so that torque generated in the drive motor unit 8027 is transferred to rear wheels (drive wheels) 8030 through an output shaft 8028 and a drive shaft 8029. Front wheels 8023 are operated following the rear wheels 8030, whereby the electric vehicle 8020 can be driven.

Sensors such as a voltage sensor, a current sensor, and a temperature sensor are provided in each of the units to monitor physical values of each part of the electric vehicle 8020, as appropriate.

The electronic control unit 8025 is a processing device including a memory such as a RAM or a ROM, and a CPU, which are not illustrated. The electronic control unit 8025 outputs a control signal to the inverter unit 8026, the drive motor unit 8027, or the power storage device 8024 on the basis of operational information of the electric vehicle 8020 (e.g., acceleration, deceleration, or a stop), temperature information of a driving environment or each unit, control information, or input data on the state of charge (SOC) of the power storage device or the like. Various data and programs are stored in the memory.

As the drive motor unit 8027, a DC motor can be used instead of the AC motor, or a combination of either of these motors and an internal-combustion engine can be used.

Note that it is needless to say that one embodiment of the present invention is not limited to the moving object described above as long as the power storage device of one embodiment of the present invention is included.

The power storage device 8024 included in the electric vehicle 8020 can be charged by being supplied with electric power through external charging equipment by a plug-in system, a contactless power supply system, or the like. FIG. 10C illustrates the state where the power storage device 8024 included in the electric vehicle 8020 is charged with the use of a ground-based charging apparatus 8021 through a cable 8022. In charging, a given method such as CHAdeMO (registered trademark) may be referred to for a charging method, the standard of a connector, or the like as appropriate. The charging apparatus 8021 may be a charging station provided in a commerce facility or a power source in a house. For example, with the use of a plug-in technique in which a connecting plug 8031 illustrated in FIG. 10B and connected to the power storage device 8024 is electrically connected to the charging apparatus 8021, the power storage device 8024 included in the electric vehicle 8020 can be charged by being supplied with electric power from outside. The power storage device 8024 can be charged by converting external electric power into DC constant voltage having a predetermined voltage level through a converter such as an AC-DC converter.

Further, although not illustrated, a power receiving device may be included in the moving object to charge the power storage device by supplying electric power from an aboveground power transmitting device in a contactless manner. In the case of the contactless power supply system, by fitting the power transmitting device in a road or an exterior wall, charging can be performed not only when the electric vehicle is stopped but also when driven. In addition, the contactless power supply system may be utilized to perform transmission/reception between moving objects. Furthermore, a solar cell may be provided in an exterior of the moving object to charge the power storage device 8024 when the electric vehicle is stopped or driven. To supply electric power in such a contactless manner, an electromagnetic induction method or a magnetic resonance method can be used.

Note that in the case where the moving object is an electric railway vehicle, a power storage device included therein can be charged by being supplied with electric power from an overhead cable or a conductor rail.

With the use of the power storage device of one embodiment of the present invention as the power storage device 8024, the power storage device 8024 can have favorable cycle characteristics and improved convenience. When the power storage device 8024 itself can be more compact and more lightweight as a result of improved characteristics of the power storage device 8024, the electric vehicle can be lightweight and fuel efficiency can be increased. Further, the power storage device 8024 included in the moving object has relatively large capacity; therefore, the power storage device 8024 can be used as an electric power supply source for indoor use, for example. In such a case, the use of a commercial power source can be avoided at peak time of electric power demand.

[Example of Electrical Device (Example of Portable Information Terminal)]

In addition, as another example of the electrical devices, a portable information terminal is described with reference to FIGS. 11A to 11C.

Figure 11A:
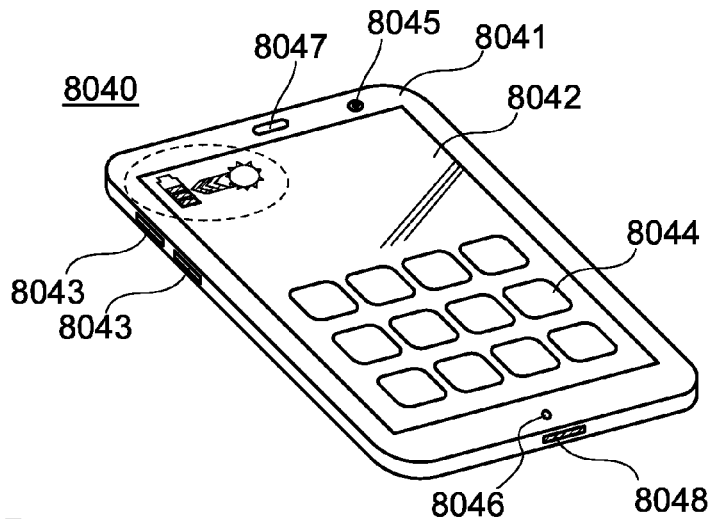
FIGS. 11A to 11C illustrate an electrical device according to an embodiment.

FIG. 11A is a perspective view illustrating a front surface and a side surface of a portable information terminal 8040. The portable information terminal 8040 is capable of executing a variety of applications such as mobile phone calls, e-mailing, viewing and editing texts, music reproduction, Internet communication, and a computer game. In the portable information terminal 8040, a housing 8041 includes a display portion 8042, a camera lens 8045, a microphone 8046, and a speaker 8047 on its front surface, a button 8043 for operation on its left side, and a connection terminal 8048 on its bottom surface.

A display module or a display panel is used for the display portion 8042. Examples of the display module or the display panel are a light-emitting device in which each pixel includes a light-emitting element typified by an organic light-emitting element (OLED); a liquid crystal display device; an electronic paper performing a display in an electrophoretic mode, an electronic liquid powder (registered trademark) mode, or the like; a digital micromirror device (DMD); a plasma display panel (PDP); a field emission display (FED); a surface conduction electron-emitter display (SED); a light-emitting diode (LED) display; a carbon nanotube display; a nanocrystal display; and a quantum dot display.

The portable information terminal 8040 illustrated in FIG. 11A is an example of providing the one display portion 8042 in the housing 8041; however, one embodiment of the present invention is not limited to this example. The display portion 8042 may be provided on a rear surface of the portable information terminal 8040. Further, the portable information terminal 8040 may be a foldable portable information terminal in which two or more display portions are provided.

A touch panel with which data can be input by an instruction means such as a finger or a stylus is provided as an input means on the display portion 8042. Therefore, icons 8044 displayed on the display portion 8042 can be easily operated by the instruction means. Since the touch panel is provided, a region for a keyboard on the portable information terminal 8040 is not needed and thus the display portion can be provided in a large region. Further, since data can be input with a finger or a stylus, a user-friendly interface can be obtained. Although the touch panel may be of any of various types such as a resistive type, a capacitive type, an infrared ray type, an electromagnetic induction type, and a surface acoustic wave type, the resistive type or the capacitive type is particularly preferable because the display portion 8042 of one embodiment of the present invention can be curved. Furthermore, such a touch panel may be what is called an in-cell touch panel, in which a touch panel is integral with the display module or the display panel.

The touch panel may also function as an image sensor. In this case, for example, an image of a palm print, a fingerprint, or the like is taken with the display portion 8042 touched with the palm or the finger, whereby personal authentication can be performed. Furthermore, with the use of backlight or a sensing light source emitting near-infrared light for the display portion 8042, an image of a finger vein, a palm vein, or the like can also be taken.

Further, instead of the touch panel, a keyboard may be provided in the display portion 8042. Furthermore, both the touch panel and the keyboard may be provided.

The button 8043 for operation can have various functions in accordance with the intended use. For example, the button 8043 may be used as a home button so that a home screen is displayed on the display portion 8042 by pressing the button 8043. Further, the portable information terminal 8040 may be configured such that main power source thereof is turned off with a press of the button 8043 for a predetermined time. A structure may also be employed in which a press of the button 8043 brings the portable information terminal 8040 which is in a sleep mode out of the sleep mode. Besides, the button can be used as a switch for starting a variety of functions, for example, depending on the length of time for pressing or by pressing the button at the same time as another button.

Further, the button 8043 may be used as a volume control button or a mute button to have a function of adjusting the volume of the speaker 8047 for outputting sound, for example. The speaker 8047 outputs various kinds of sound, examples of which are sound set for predetermined processing, such as startup sound of an operating system (OS), sound from sound files executed in various applications, such as music from music reproduction application software, and an incoming e-mail alert. Although not illustrated, a connector for outputting sound to a device such as headphones, earphones, or a headset may be provided together with or instead of the speaker 8047 for outputting sound.

As described above, the button 8043 can have various functions. Although the number of the button 8043 is two in the portable information terminal 8040 in FIG. 11A, it is needless to say that the number, arrangement, position, or the like of the buttons is not limited to this example and can be designed as appropriate.

The microphone 8046 can be used for sound input and recording. Images obtained with the use of the camera lens 8045 can be displayed on the display portion 8042.

In addition to the operation with the touch panel provided on the display portion 8042 or the button 8043, the portable information terminal 8040 can be operated by recognition of user's movement (gesture) (also referred to as gesture input) using the camera lens 8045, a sensor provided in the portable information terminal 8040, or the like. Alternatively, with the use of the microphone 8046, the portable information terminal 8040 can be operated by recognition of user's voice (also referred to as voice input). By introducing a natural user interface (NUI) technique which enables data to be input to an electrical device by natural behavior of a human, the operational performance of the portable information terminal 8040 can be further improved.

The connection terminal 8048 is a terminal for inputting a signal at the time of communication with an external device or inputting electric power at the time of power supply. For example, the connection terminal 8048 can be used for connecting an external memory drive to the portable information terminal 8040. Examples of the external memory drive are storage medium drives such as an external hard disk drive (HDD), a flash memory drive, an optical disk drive, a magneto-optical disk drive, a digital versatile disk (DVD) drive, a DVD-recordable (DVD-R) drive, a DVD-rewritable (DVD-RW) drive, a compact disc (CD) drive, a compact disc recordable (CD-R) drive, a compact disc rewritable (CD-RW) drive, a magneto optical (MO) disc drive, a floppy disk drive (FDD), and a nonvolatile solid state drive (SSD) device. Although the portable information terminal 8040 has the touch panel on the display portion 8042, a keyboard may be provided on the housing 8041 instead of the touch panel or may be externally added.

Figure 11B:
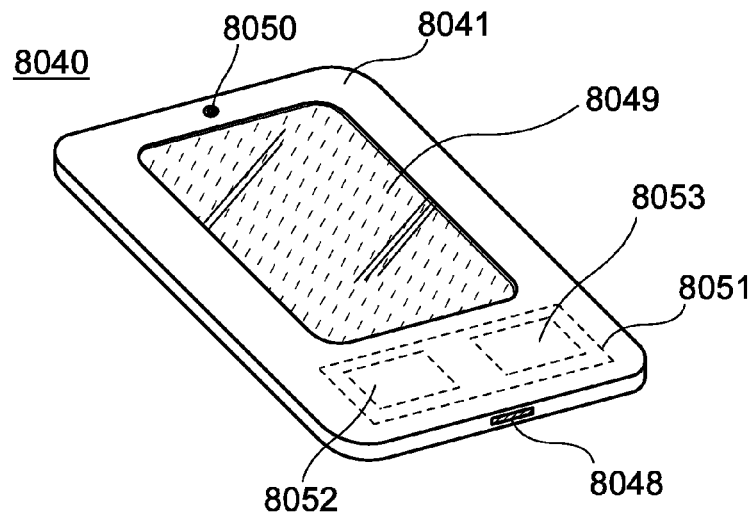

FIG. 11B is a perspective view illustrating the rear surface and the side surface of the portable information terminal 8040. In the portable information terminal 8040, the housing 8041 includes a solar cell 8049 and a camera lens 8050 on its rear surface; the portable information terminal 8040 further includes a charge and discharge control circuit 8051, a power storage device 8052, a DC-DC converter 8053, and the like. FIG. 11B illustrates an example where the charge and discharge control circuit 8051 includes the power storage device 8052 and the DC-DC converter 8053. The power storage device of one embodiment of the present invention, which is described in the above embodiment, is used as the power storage device 8052.

The solar cell 8049 attached on the rear surface of the portable information terminal 8040 can supply power to the display portion, the touch panel, a video signal processor, and the like. Note that the solar cell 8049 can be provided on one or both surfaces of the housing 8041. By including the solar cell 8049 in the portable information terminal 8040, the power storage device 8052 in the portable information terminal 8040 can be charged even in a place where an electric power supply unit is not provided, such as outdoors.

As the solar cell 8049, it is possible to use any of the following: a silicon-based solar cell including a single layer or a stacked layer of single crystal silicon, polycrystalline silicon, microcrystalline silicon, or amorphous silicon; an InGaAs-based, GaAs-based, CIS-based, $Cu_2ZnSnS_4$-based, or CdTe—CdS-based solar cell; a dye-sensitized solar cell including an organic dye; an organic thin film solar cell including a conductive polymer, fullerene, or the like; a quantum dot solar cell having a pin structure in which a quantum dot structure is formed in an i-layer with silicon or the like; and the like.

Here, an example of a structure and operation of the charge and discharge control circuit 8051 illustrated in FIG. 11B is described with reference to a block diagram in FIG. 11C.

Figure 11C:
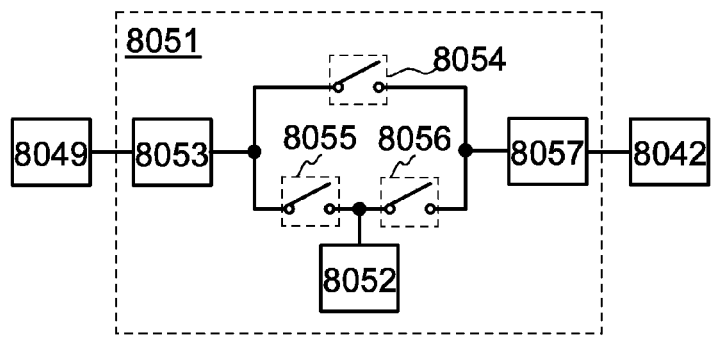

FIG. 11C illustrates the solar cell 8049, the power storage device 8052, the DC-DC converter 8053, a converter 8057, a switch 8054, a switch 8055, a switch 8056, and the display portion 8042. The power storage device 8052, the DC-DC converter 8053, the converter 8057, and the switches 8054 to 8056 correspond to the charge and discharge control circuit 8051 in FIG. 11B.

The voltage of electric power generated by the solar cell 8049 with the use of external light is raised or lowered by the DC-DC converter 8053 to be at a level needed for charging the power storage device 8052. When electric power from the solar cell 8049 is used for the operation of the display portion 8042, the switch 8054 is turned on and the voltage of the electric power is raised or lowered by the converter 8057 to a voltage needed for operating the display portion 8042. In addition, when display on the display portion 8042 is not performed, the switch 8054 is turned off and the switch 8055 is turned on so that the power storage device 8052 may be charged.

Although the solar cell 8049 is described as an example of a power generation means, the power generation means is not particularly limited thereto, and the power storage device 8052 may be charged by another power generation means such as a piezoelectric element or a thermoelectric conversion element (Peltier element). The charging method of the power storage device 8052 in the portable information terminal 8040 is not limited thereto, and the connection terminal 8048 may be connected to a power source to perform charge, for example. The power storage device 8052 may be charged by a non-contact power transmission module performing charge by transmitting and receiving electric power wirelessly (without contact), or any of the above charging methods may be used in combination.

Here, the state of charge (SOC) of the power storage device 8052 is displayed on the upper left corner (in the dashed frame in FIG. 11A) of the display portion 8042. Thus, the user can check the state of charge of the power storage device 8052 and can accordingly select a power saving mode of the portable information terminal 8040. When the user selects the power saving mode, for example, the button 8043 or the icons 8044 can be operated to switch the components of the portable information terminal 8040, e.g., the display module or the display panel, an arithmetic unit such as CPU, and a memory, to the power saving mode. Specifically, in each of the components, the use frequency of a given function is decreased to stop the use. Further, the portable information terminal 8040 can be configured to be automatically switched to the power saving mode depending on the state of charge. Furthermore, by providing a sensor such as an optical sensor in the portable information terminal 8040, the amount of external light at the time of using the portable information terminal 8040 is sensed to optimize display luminance, which makes it possible to reduce the power consumption of the power storage device 8052.

In addition, when charging with the use of the solar cell 8049 or the like is performed, an image or the like showing that the charging is performed with the solar cell may be displayed on the upper left corner (in the dashed frame) of the display portion 8042 as illustrated in FIG. 11B.

It is needless to say that one embodiment of the present invention is not limited to the electrical device illustrated in FIGS. 11A to 11C as long as the power storage device of one embodiment of the present invention is included.

[Example of Electrical Device (Example of Power Storage System)]

Figure 12A:
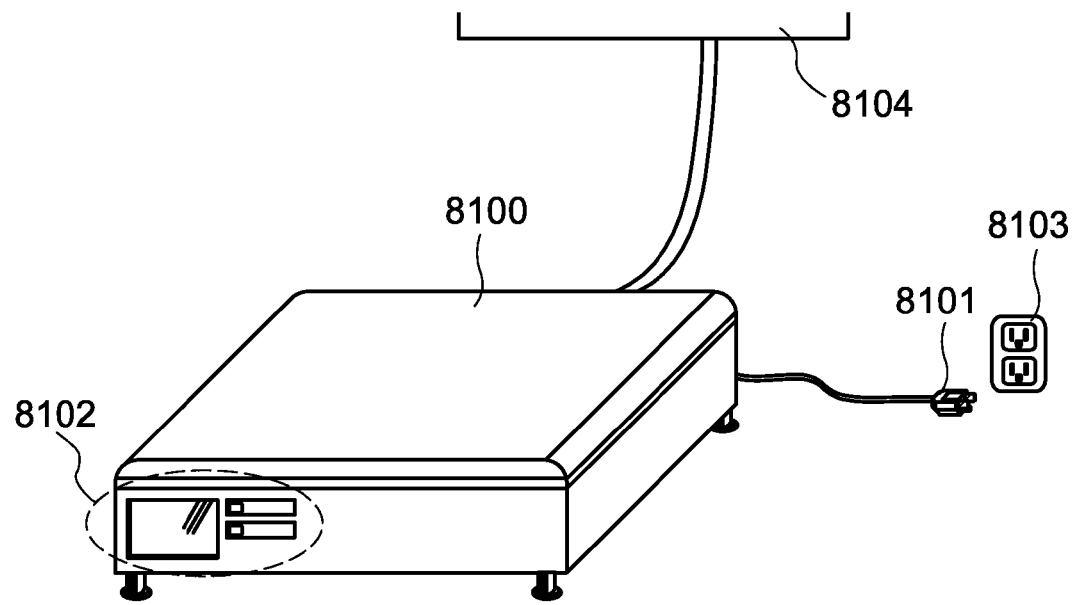
FIGS. 12A and 12B illustrate an electrical device according to an embodiment.
Figure 12B:
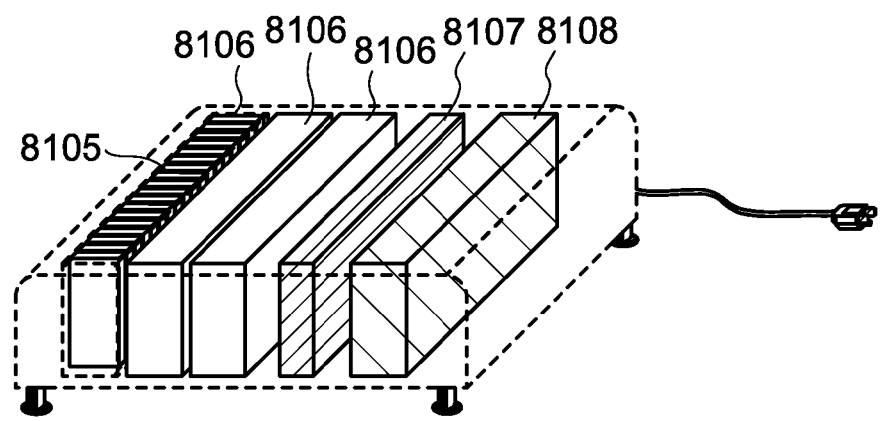

A power storage system is described as another example of the electrical devices with reference to FIGS. 12A and 12B. A power storage system 8100 to be described here can be used at home as the power storage system 8005 described above. Here, the power storage system 8100 is described as a home-use power storage system as an example; however, it is not limited thereto and can also be used for business use or other uses.

As illustrated in FIG. 12A, the power storage system 8100 includes a plug 8101 for being electrically connected to a system power supply 8103. Further, the power storage system 8100 is electrically connected to a panelboard 8104 installed in home.

The power storage system 8100 may further include a display panel 8102 for displaying an operation state or the like, for example. The display panel may have a touch screen. In addition, the power storage system 8100 may include a switch for turning on and off a main power source, a switch to operate the power storage system, and the like as well as the display panel.

Although not illustrated, an operation switch to operate the power storage system 8100 may be provided separately from the power storage system 8100; for example, the operation switch may be provided on a wall in a room. Alternatively, the power storage system 8100 may be connected to a personal computer, a server, or the like provided in home, in order to be operated indirectly. Still alternatively, the power storage system 8100 may be remotely operated using the Internet, an information terminal such as a smartphone, or the like. In such cases, a mechanism that performs wired or wireless communication between the power storage system 8100 and other devices is provided in the power storage system 8100.

FIG. 12B is a schematic view illustrating the inside of the power storage system 8100. The power storage system 8100 includes a plurality of power storage device groups 8106, a battery management unit (BMU) 8107, and a power conditioning system (PCS) 8108.

In the power storage device group 8106, the plurality of power storage devices 8105 described above are connected to each other. Electric power from the system power supply 8103 can be stored in the power storage device group 8106. The plurality of power storage device groups 8106 are each electrically connected to the BMU 8107.

The BMU 8107 has functions of monitoring and controlling states of the plurality of power storage devices 8105 in the power storage device group 8106 and protecting the power storage devices 8105. Specifically, the BMU 8107 collects data of cell voltages and cell temperatures of the plurality of power storage devices 8105 in the power storage device group 8106, monitors overcharge and overdischarge, monitors overcurrent, controls a cell balancer, manages the deterioration condition of a battery, calculates the remaining battery level (the state of charge (SOC)), controls a cooling fan of a driving power storage device, or controls detection of failure, for example. Note that the power storage devices 8105 may have some of or all the functions, or the power storage device groups may have the functions. The BMU 8107 is electrically connected to the PCS 8108.

Here, as an electronic circuit included in the BMU 8107, an electronic circuit including the oxide semiconductor transistor described above is preferably provided. In this case, power consumption of the BMU 8107 can be significantly reduced.

The PCS 8108 is electrically connected to the system power supply 8103, which is an AC power source and performs DC-AC conversion. For example, the PCS 8108 includes an inverter, a system interconnection protective device that detects irregularity of the system power supply 8103 and terminates its operation, and the like. In charging the power storage system 8100, for example, AC power from the system power supply 8103 is converted into DC power and transmitted to the BMU 8107. In discharging the power storage system 8100, electric power stored in the power storage device group 8106 is converted into AC power and supplied to an indoor load, for example. Note that the electric power may be supplied from the power storage system 8100 to the load through the panelboard 8104 as illustrated in FIG. 12A or may be directly supplied from the power storage system 8100 through wired or wireless transmission.

Note that a power source for charging the power storage system 8100 is not limited to the system power supply 8103 described above; for example, electric power may be supplied from a solar power generating system installed outside or a power storage system mounted on an electric vehicle.

This embodiment can be combined with any of the other embodiments disclosed in this specification as appropriate.

This application is based on Japanese Patent Application serial No. 2012-287543 filed with Japan Patent Office on Dec. 28, 2012, the entire contents of which are hereby incorporated by reference.

What is claimed is:

1. A power storage device comprising:
    an exterior material;
    a positive electrode;
    a negative electrode facing the positive electrode;
    an electrolyte solution between the positive electrode and the negative electrode; and
    an adsorbent,
    wherein the positive electrode, the negative electrode, the electrolyte solution, and the adsorbent are provided inside the exterior material,
    wherein a separation body is provided between the electrolyte solution and the adsorbent,
    wherein the separation body is impermeable to the electrolyte solution and permeable to a gas, and
    wherein an entire surface of the adsorbent is coated with the separation body.

2. The power storage device according to claim 1,
    wherein a space surrounded by the separation body is provided inside the exterior material, and
    wherein the adsorbent is provided in the space.

3. The power storage device according to claim 1,
    wherein a space surrounded by an inner wall of the exterior material and the separation body is provided inside the exterior material, and
    wherein the adsorbent is provided in the space.

4. The power storage device according to claim 1,
    wherein the adsorbent coated with the separation body is fixed to a support, and
    wherein the support is provided to overlap with the positive electrode and the negative electrode.

5. The power storage device according to claim 4, wherein the support is provided between the positive electrode and the negative electrode to overlap with the positive electrode and the negative electrode.

6. A power storage device comprising:
an exterior material;
a positive electrode;
a negative electrode facing the positive electrode;
an electrolyte solution between the positive electrode and the negative electrode; and
an adsorbent including zeolite,
wherein the positive electrode, the negative electrode, the electrolyte solution, and the adsorbent are provided inside the exterior material,
wherein a separation body including cellulose is provided between the electrolyte solution and the adsorbent,
wherein the separation body is impermeable to the electrolyte solution and permeable to a gas, and
wherein an entire surface of the adsorbent is coated with the separation body.

7. The power storage device according to claim 6,
wherein a space surrounded by the separation body is provided inside the exterior material, and
wherein the adsorbent is provided in the space.

8. The power storage device according to claim 6,
wherein a space surrounded by an inner wall of the exterior material and the separation body is provided inside the exterior material, and
wherein the adsorbent is provided in the space.

9. The power storage device according to claim 6,
wherein the adsorbent coated with the separation body is fixed to a support, and
wherein the support is provided to overlap with the positive electrode and the negative electrode.

10. The power storage device according to claim 9, wherein the support is provided between the positive electrode and the negative electrode to overlap with the positive electrode and the negative electrode.

* * * * *